US011985205B2

(12) United States Patent
Zhao et al.

(10) Patent No.: US 11,985,205 B2
(45) Date of Patent: May 14, 2024

(54) EVENT NOTIFICATION METHOD, SERVER DEVICE, APPARATUS AND COMPUTER STORAGE MEDIUM

(71) Applicants:BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Jing Su, Beijing (CN); Qian Zhang, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/077,306

(22) Filed: Dec. 8, 2022

(65) Prior Publication Data
US 2023/0164232 A1    May 25, 2023

Related U.S. Application Data

(63) Continuation-in-part of application No. 17/296,710, filed as application No. PCT/CN2019/119970 on Nov. 21, 2019, now Pat. No. 11,553,050.

(30) Foreign Application Priority Data

Nov. 28, 2018    (CN) .......................... 201811432991.5

(51) Int. Cl.
*H04L 67/55*    (2022.01)
(52) U.S. Cl.
CPC .................................. *H04L 67/55* (2022.05)

(58) Field of Classification Search
CPC ...................................................... H04L 67/55
(Continued)

(56) References Cited

U.S. PATENT DOCUMENTS

| 6,738,635 B1 | 5/2004 | Lewis et al. |
| 7,948,955 B2 | 5/2011 | Shi |

(Continued)

FOREIGN PATENT DOCUMENTS

| CN | 1901550 A | 1/2007 |
| CN | 101159711 A | 4/2008 |

(Continued)

OTHER PUBLICATIONS

StackExchange, Is it possible to have multiple ISR routines for a single timer in micro controller?, Aug. 12, 2013, electronics.stackexchange.com, https://electronics.stackexchange.com/questions/78703/is-it-possible-to-have-multiple-isr-routines-for-a-single-timer-in-micro-control (Year: 2013).*

(Continued)

*Primary Examiner* — Zi Ye
(74) *Attorney, Agent, or Firm* — Dilworth & Barrese, LLP.; Michael J Musella, Esq.

(57) ABSTRACT

An event notification method, an apparatus, a server device, and a computer storage medium are disclosed. The method includes: receiving an event subscription request; determining whether an amount of times that an event notification rule is satisfied is equal to K, and if yes, sending an event notification to at least one notified party in the plurality of notified parties; and after the initial notification is performed, determining whether the amount of times that the event notification rule is satisfied is equal to P, and if yes, sending an event notification to at least one notified party in the plurality of notified parties. The initial notification and the re-notification are performed at different times, and the (Continued)

at least one notified party notified in the initial notification is at least partially different from the at least one notified party notified in the re-notification.

20 Claims, 25 Drawing Sheets

(58) Field of Classification Search
USPC .......................................................... 709/223
See application file for complete search history.

(56) References Cited

U.S. PATENT DOCUMENTS

| | | | |
|---|---|---|---|
| 9,324,055 B2 | 4/2016 | Shah et al. | |
| 10,476,758 B2 | 11/2019 | Marvin et al. | |
| 2003/0046395 A1 | 3/2003 | Fleming et al. | |
| 2004/0098459 A1* | 5/2004 | Leukert-Knapp | G06Q 10/10 709/224 |
| 2010/0169344 A1 | 7/2010 | Ellis | |
| 2015/0067154 A1* | 3/2015 | Ly | H04L 67/55 709/224 |
| 2016/0007138 A1 | 1/2016 | Palanisamy et al. | |
| 2016/0125725 A1 | 5/2016 | Sager et al. | |
| 2016/0335681 A1 | 11/2016 | Swanson | |
| 2017/0048646 A1 | 2/2017 | Foti | |
| 2018/0167785 A1* | 6/2018 | Wang | H04L 67/566 |
| 2019/0273790 A1 | 9/2019 | Zhao | |
| 2019/0313212 A1 | 10/2019 | Lee et al. | |
| 2019/0340041 A1 | 11/2019 | Banisadr et al. | |
| 2021/0152653 A1 | 5/2021 | Guo et al. | |

FOREIGN PATENT DOCUMENTS

| | | | |
|---|---|---|---|
| CN | 102790688 A | | 11/2012 |
| CN | 105471604 A | | 4/2016 |
| CN | 106603394 A | | 4/2017 |
| CN | 106683331 A | | 5/2017 |
| CN | 106973118 A | | 7/2017 |
| CN | 107431722 A | | 12/2017 |
| CN | 107579854 A | | 1/2018 |
| CN | 107666432 A | | 2/2018 |
| CN | 107968805 A | | 4/2018 |
| JP | 2006092254 A | | 4/2006 |
| JP | 2012088855 A | * | 5/2012 |
| WO | 2017087367 A1 | | 5/2017 |

OTHER PUBLICATIONS

LogicMonitor, [WEBINAR] How to Route Alerts with LogicMonitor's HipChat Integration, Sep. 7, 2017, YouTube, https://www.youtube.com/watch?v=cB_jUZgn2y0 (Year: 2017).*
Extended European Search Report from European Patent Application No. 19889627.6 dated Jun. 7, 2022.
First Chinese Office Action from Chinese Patent Application No. 201811432991.5 dated Jan. 5, 2021.
United States Office Action from U.S. Appl. No. 16/519,525 dated Jun. 1, 2020.
First Chinese Office Action from Chinese Patent Application No. 201811454645.7 dated Jan. 4, 2022.
Chinese International Search Report and Written Opinion dated Feb. 12, 2020 in International Application No. PCT/CN2019/119970.
Notice of Allowance from U.S. Appl. No. 17/296,710 dated Sep. 9, 2022.
Japanese Office Action issued by the Japan Patent Office in Japanese Application No. 2021-530220; dated Sep. 11, 2023.

* cited by examiner

EVENT NOTIFICATION METHOD, SERVER DEVICE, APPARATUS AND COMPUTER STORAGE MEDIUM

This application is a continuation in part of U.S. patent application Ser. No. 17/296,710 filed on May 25, 2021, which is a U.S. National Phase Entry of International Application No. PCT/CN2019/119970 filed on Nov. 21, 2019, which claims priority to and the benefit of Chinese patent application No. 201811432991.5 filed on Nov. 28, 2018. The above-identified applications are incorporated by reference herein in their entirety.

TECHNICAL FIELD

The present disclosure relates to the field of Internet of Things, and more particularly to an event notification method, an event notification apparatus, a server device, and a computer storage medium.

BACKGROUND

With the development of information technology, especially Internet technology, IoT (Internet of Things) technology for informationization, remote management control, and intelligence has gradually matured. IoT uses communication technologies such as local networks or the Internet to connect sensors, controllers, machines, people, and objects in new ways to form connections between people and things, as well as between things and things. With the rapid development of IoT technology in various application fields, more and more devices are connected to IoT, and various new application fields such as smart home, smart transportation, and smart health have emerged. A device terminal connected to IoT platform can subscribe to the data related thereto by sending a subscription request to the IoT platform, and the IoT platform sends an event notification to a notified party in the subscription request when a subscription condition is met.

SUMMARY

One aspect of the present disclosure provides an event notification method, comprising: receiving an event subscription request from a subscriber, the event subscription request including one or more notified parties; dividing the one or more notified parties into one or more groups, each group of the one or more groups including one or more notified parties; and sending an event notification to notified parties in at least one group of the one or more groups.

According to some embodiments of the disclosure, sending an event notification to notified parties in at least one group of the one or more groups comprises: determining whether an event notification rule is satisfied, and in the case where the event notification rule is satisfied, sending an event notification to notified parties in at least one group of the one or more groups.

According to some embodiments of the disclosure, sending an event notification to notified parties in at least one group of the one or more groups further comprises: after an event notification is sent, determining whether a re-notification criterion is satisfied, and in the case where the re-notification criterion is satisfied, sending an event notification to notified parties in at least one group of the one or more groups.

According to some embodiments of the disclosure, determining whether a re-notification criterion is satisfied comprises: determining, at a time point determined by a check event notification interval, whether an event notification rule is satisfied, and in the case where the event notification rule is satisfied, determining that the re-notification criterion is satisfied.

According to some embodiments of the disclosure, determining whether a re-notification criterion is satisfied comprises: determining, at a time point determined by a send notification interval, whether an event notification rule is satisfied, and in the case where the event notification rule is satisfied, determining that the re-notification criterion is satisfied.

According to some embodiments of the disclosure, determining whether a re-notification criterion is satisfied comprises: determining, at a time point determined by a send notification interval, that the re-notification criterion is satisfied.

According to some embodiments of the disclosure, the method further comprises: setting a send notification interval and a check event notification interval, wherein the send notification interval is greater than the check event notification interval, and determining whether a re-notification criterion is satisfied comprises: determining, at a time point determined by the check event notification interval, whether an event notification rule is satisfied, and in the case where the event notification rule is satisfied, waiting for an event notification to be sent, determining, at a time point determined by the send notification interval, that the re-notification criterion is satisfied, and sending an event notification to notified parties in at least one group of the one or more groups.

According to some embodiments of the disclosure, the method further comprises: setting a send notification interval and a check event notification interval, wherein the send notification interval is smaller than the check event notification interval, and determining whether a re-notification criterion is satisfied comprises: determining, at a time point determined by the send notification interval, that a re-notification criterion is satisfied, and the method further comprises: determining, at a time point determined by the check event notification interval, whether an event notification rule is satisfied, and in the case where the event notification rule is satisfied, waiting for an event notification to be sent, and sending, at a time point determined by the send notification interval, an event notification to notified parties in at least one group of the one or more groups.

According to some embodiments of the disclosure, the method further comprises defining at least one of the following attributes: an event notification rule attribute used for determining whether to send an event notification to notified parties; and an event notification list attribute used for storing address information of the one or more notified parties based on the one or more groups.

According to some embodiments of the disclosure, the method further comprises: defining a check event notification interval attribute used for setting a time interval at which it is determined whether an event notification rule is satisfied, and defining a send notification interval attribute used for setting an interval at which an event notification is sent.

According to some embodiments of the disclosure, the method further comprises defining a check event notification enable attribute used for setting whether to enable the check event notification interval attribute.

According to some embodiments of the disclosure, the event subscription request is used for requesting receipt of update data from an application entity.

According to some embodiments of the disclosure, the method further comprises determining whether an event notification rule is satisfied based on the update data.

According to some embodiments of the disclosure, a group to which an event notification is sent in the case where the event notification rule is satisfied is denoted as an initial-notification group, and a group to which an event notification is sent in the case where the re-notification criterion is satisfied is denoted as a re-notification group, the initial-notification group is different from the re-notification group.

According to some embodiments of the disclosure, sending an event notification to notified parties in at least one group of the one or more groups further comprises: determining at least one group of the one or more groups to which an event notification is to be sent based on an order of the one or more groups.

According to some embodiments of the disclosure, sending an event notification to notified parties in at least one group of the one or more groups comprises: determining whether the event notification rule is satisfied, and in the case where the event notification rule is satisfied, determining whether the re-notification criterion is satisfied; in the case where the re-notification criterion is satisfied, sending an event notification to notified parties in at least one group of the one or more groups.

According to some embodiments of the present disclosure, determining whether the re-notification criterion is satisfied comprises: determining, at a time point determined by the check event notification interval, whether the event notification rule is satisfied, and in the case where the event notification rule is satisfied, determining that the re-notification criterion is satisfied.

According to some embodiments of the present disclosure, the event subscription request is at least one of a single-resource subscription request and a cross-resource subscription request.

Another aspect of the present disclosure provides a server device, comprising a transceiver and a processor, wherein the transceiver is configured to receive an event subscription request from a subscriber, the event subscription request including one or more notified parties; the processor is configured to divide the one or more notified parties into one or more groups, each group of the one or more groups including one or more notified parties, and instruct the transceiver to send an event notification to notified parties in at least one group of the one or more groups.

According to some embodiments of the disclosure, the processor is further configured to: determine whether an event notification rule is satisfied, and in the case where the event notification rule is satisfied, instruct the transceiver to send an event notification to notified parties in at least one group of the one or more groups.

According to some embodiments of the disclosure, the processor is further configured to: after instructing the transceiver to send an event notification to notified parties in at least one group of the one or more groups, determine whether a re-notification criterion is satisfied, and in the case where the re-notification criterion is satisfied, instruct the transceiver to send an event notification to notified parties in at least one group of the one or more groups; wherein a group to which an event notification is sent in the case where the event notification rule is satisfied is denoted as an initial-notification group, and a group to which an event notification is sent in the case where the re-notification criterion is satisfied is denoted as a re-notification group, the initial-notification group is different from the re-notification group.

Another aspect of the present disclosure provides an event notification apparatus, comprising: one or more processors; and one or more memories in which computer-readable codes are stored, the computer-readable codes causing, when executed by the one or more processors, the method of claim 1 to be performed.

Another aspect of the present disclosure provides a computer storage medium having stored thereon computer-readable codes, the computer-readable codes causing, when executed by the one or more processors, the method of claim 1 to be performed.

At least one embodiment of the present disclosure provides an event notification method, which comprises: receiving an event subscription request from a subscriber, the event subscription request comprising a plurality of notified parties; determining whether an amount of times that an event notification rule is satisfied is equal to K, and in a case where it is determined that the amount of times that the event notification rule is satisfied is equal to K, sending an event notification to at least one notified party in the plurality of notified parties, wherein sending the event notification in the case where it is determined that the amount of times that the event notification rule is satisfied is equal to K is denoted as initial notification, and K is a positive integer; and after the initial notification is performed, determining whether the amount of times that the event notification rule is satisfied is equal to P, and in a case where it is determined that the amount of times that the event notification rule is satisfied is equal to P, sending an event notification to at least one notified party in the plurality of notified parties, wherein sending the event notification in the case where it is determined that the amount of times that the event notification rule is satisfied is equal to P is denoted as re-notification, and P is a positive integer, where the initial notification and the re-notification are performed at different times, and the at least one notified party notified in the initial notification is at least partially different from the at least one notified party notified in the re-notification.

According to some embodiments of the disclosure, when determining whether the amount of times that the event notification rule is satisfied is equal to K, the amount of times that the event notification rule is satisfied is counted by a first count parameter; when determining whether the amount of times that the event notification rule is satisfied is equal to P, the amount of times that the event notification rule is satisfied is counted by a second count parameter; and the first count parameter and the second count parameter are a same count parameter.

According to some embodiments of the disclosure, $P \geq K+1$.

According to some embodiments of the disclosure, when determining whether the amount of times that the event notification rule is satisfied is equal to K, the amount of times that the event notification rule is satisfied is counted by a first count parameter; when determining whether the amount of times that the event notification rule is satisfied is equal to P, the amount of times that the event notification rule is satisfied is counted by a second count parameter; and the first count parameter and the second count parameter are different count parameters, and the second count parameter starts counting after the initial notification is performed.

According to some embodiments of the disclosure, the method further comprises: after the re-notification is performed, determining whether the amount of times that the event notification rule is satisfied is equal to Q, and in a case where it is determined that the amount of times that the event notification rule is satisfied is equal to Q, sending an event notification to at least one notified party in the plurality of notified parties, wherein sending the event notification in the case where it is determined that the amount of times that the event notification rule is satisfied is equal to Q is denoted as a third notification, and Q is a positive integer, wherein the third notification, the initial notification and the re-notification are performed at different times, and the at least one notified party notified in the third notification is at least partially different from the at least one notified party notified in the initial notification, and is at least partially different from the at least one notified party notified in the re-notification.

According to some embodiments of the disclosure, the plurality of notified parties are divided into a plurality of groups, and each group of the plurality of groups comprises at least one notified party, the at least one notified party sent with the event notification in the initial notification is denoted as an initial-notification group, the at least one notified party sent with the event notification in the re-notification is denoted as a re-notification group, and the initial-notification group is different from the re-notification group.

According to some embodiments of the disclosure, the at least one notified party comprised in the initial-notification group and the at least one notified party comprised in the re-notification group are at least partially different from each other.

According to some embodiments of the disclosure, the event subscription request is used for subscribing for an event related to a resource, and the event subscription request is a single-resource subscription request.

According to some embodiments of the disclosure, the event subscription request is used for subscribing for events related to multiple resources, and the event subscription request is a cross-resource subscription request.

According to some embodiments of the disclosure, the method further comprises: determining whether the event notification rule is satisfied based on update data of the multiple resources within a preset time window.

According to some embodiments of the disclosure, determining whether the event notification rule is satisfied based on the update data of the multiple resources within the preset time window comprises: in response to receiving the updated data of each resource within the preset time window, determining that the event notification rule is satisfied; and in response to failure to receive the updated data of at least one resource within the preset time window, determining that the event notification rule is not satisfied.

According to some embodiments of the disclosure, the method further comprises defining at least a part of following attributes: an event notification rule attribute used for determining whether to send the event notification to the notified party; or an event notification list attribute used for storing address information of the plurality of notified parties.

According to some embodiments of the disclosure, the method further comprises: determining the at least one notified party to which the event notification is to be sent based on an order of the plurality of notified parties.

According to some embodiments of the disclosure, determining whether the amount of times that the event notification rule is satisfied is equal to P comprises: determining, at a time point determined by a check event notification interval, whether the event notification rule is satisfied, and when the event notification rule is satisfied, determining whether the amount of times that the event notification rule is satisfied is equal to P.

According to some embodiments of the disclosure, determining whether the amount of times that the event notification rule is satisfied is equal to P comprises: determining, at a time point determined by a send notification interval, whether the event notification rule is satisfied, and when the event notification rule is satisfied, determining whether the amount of times that the event notification rule is satisfied is equal to P.

At least one embodiment of the present disclosure provides a server device, which comprises a transceiver and a processor. The transceiver is configured to receive an event subscription request from a subscriber, and the event subscription request comprises a plurality of notified parties. The processor is configured to: determine whether an amount of times that an event notification rule is satisfied is equal to K, and in a case where it is determined that the amount of times that the event notification rule is satisfied is equal to K, send an event notification to at least one notified party in the plurality of notified parties, wherein sending the event notification in the case where it is determined that the amount of times that the event notification rule is satisfied is equal to K is denoted as initial notification, and K is a positive integer; and after the initial notification is performed, determine whether the amount of times that the event notification rule is satisfied is equal to P, and in a case where it is determined that the amount of times that the event notification rule is satisfied is equal to P, send an event notification to at least one notified party in the plurality of notified parties, wherein sending the event notification in the case where it is determined that the amount of times that the event notification rule is satisfied is equal to P is denoted as re-notification, and P is a positive integer, where the initial notification and the re-notification are performed at different times, and the at least one notified party notified in the initial notification is at least partially different from the at least one notified party notified in the re-notification.

According to some embodiments of the disclosure, when determining whether the amount of times that the event notification rule is satisfied is equal to K, the amount of times that the event notification rule is satisfied is counted by a first count parameter; when determining whether the amount of times that the event notification rule is satisfied is equal to P, the amount of times that the event notification rule is satisfied is counted by a second count parameter; and the first count parameter and the second count parameter are a same count parameter.

According to some embodiments of the disclosure, when determining whether the amount of times that the event notification rule is satisfied is equal to K, the amount of times that the event notification rule is satisfied is counted by a first count parameter; when determining whether the amount of times that the event notification rule is satisfied is equal to P, the amount of times that the event notification rule is satisfied is counted by a second count parameter; and the first count parameter and the second count parameter are different count parameters, and the second count parameter starts counting after the initial notification is performed.

At least one embodiment of the present disclosure provides an event notification apparatus, which comprises: one or more processors; and one or more memories in which computer-readable codes are stored. The computer-readable codes cause, when executed by the one or more processors, the method described above to be performed.

At least one embodiment of the present disclosure provides a non-volatile computer storage medium, in which computer-readable codes are stored. The computer-readable codes cause, when executed by one or more processors, the method described above to be performed.

BRIEF DESCRIPTION OF THE DRAWINGS

In order to more clearly illustrate the technical solutions in the embodiments of the present disclosure or in the prior art, drawings necessary for describing the embodiments or the prior art will be briefly introduced below, obviously, the below described drawings are only some embodiments of the present disclosure, for those skilled in the art, other drawings may also be obtained based on these drawings without paying creative efforts.

DETAILED DESCRIPTION OF THE EMBODIMENTS

Figure 1:
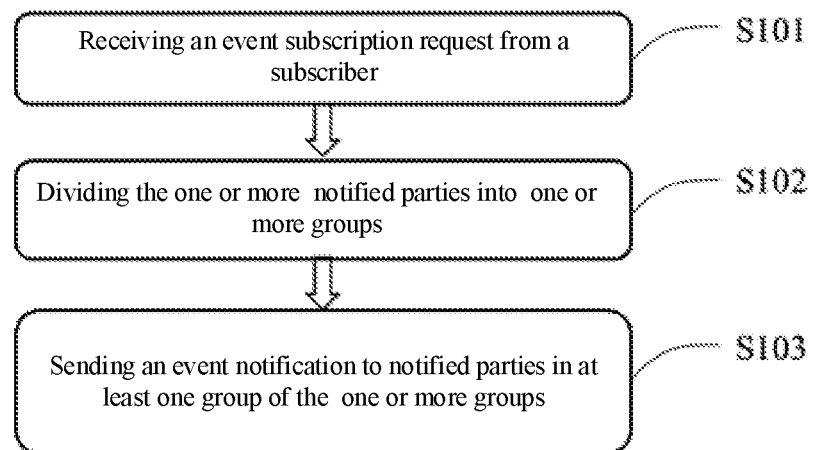
FIG. 1 illustrates a flow chart of an event notification method according to some embodiments of the present disclosure.

Hereinafter, the technical solutions in the embodiments of the present disclosure will be described clearly and comprehensively in combination with the drawings thereof, obviously, these described embodiments are only parts of the embodiments of the present disclosure, rather than all of the embodiments thereof, all the other embodiments obtained by those of ordinary skill in the art based on the embodiments of the present disclosure without paying creative efforts fall into the protection scope of the present disclosure.

Words and expressions such as "first", "second" and the like used in the present disclosure do not denote any sequence, quantity or priority, but are used only to distinguish different components. Likewise, words such as "include", "comprise" and the like refer to that an element or an object before this word contains all the elements or objects listed thereinafter or alternatives thereof, without excluding other elements or objects. Words such as "connected", "connecting" and the like are not restricted to physical or mechanical connections, but may include electrical connections, regardless of direct or indirect connections.

The flow chart is used in the present disclosure to illustrate steps of the method according to some embodiments of the present application. It should be understood that the preceding or subsequent steps may not be necessarily performed precisely in order. Instead, the respective steps may be processed in reverse order or simultaneously. At the same time, other operations may be added to these processes, or one or several steps may be removed from these processes.

Internet of Things may serve as an extension of the Internet, it includes the Internet and all the resources on the Internet, and is compatible with all Internet applications. With the application of IoT technology in various fields, various new application fields such as smart home, smart transportation, and smart health have emerged.

With the development of the IoT technology, more and more terminal devices are connected to the IoT platform, such as smoke alarms, fire alarms, and manhole cover movement sensors. The IoT platform may be implemented, for example, as a universal service entity, and the terminal devices may be connected to the universal service entity by sending registration information to the universal service entity, and the universal service entity manages the terminal devices connected thereto. The terminal devices may be denoted as application entities, and an application entity connected to the universal service entity may perform operations such as data transmission and information interaction with the universal service entity. It should be noted that the application entity described herein may be an IoT terminal device, or may be a software module or the like in the device.

Some application entities (e.g., serving as subscribers) may subscribe to information, data, etc. for example from other application entities (e.g., serving as subscribed parities) by sending a subscription request to the universal service entity, the subscribers may also request data, operations, etc. for example from the universal service entity, no limitations are made herein. The subscription request may include one or more notified parties for receiving an event notification related to the subscription request. The subscription request may further include an event notification rule, that is, in the case where the event notification rule is satisfied (e.g., a smoke alarm being triggered), an event notification is sent to the notified parties included in the subscription request, and the event notification rule may also be called a subscription condition. Thus, when the event notification rule is satisfied, the universal service entity sends an event notification to all notified parties included in the subscription request. For example, when a manhole cover is moved, the manhole cover movement sensor will sense this change and send update data to the universal service entity, and the universal service entity can determine whether the event notification rule is satisfied based on the update data from the manhole cover movement sensor, for example, in the case where the s event notification rule is manhole cover movement, at this time, the universal service entity determines that the event notification rule is satisfied, and sends an event notification to all the notified parties that are included in the subscription request and which is used to request subscription to manhole cover movement, that is, notifying all the notified parties the event that the manhole cover was moved.

In the existing subscription request notification rule, once the subscription condition is met, the universal service entity will send an event notification to all notified parties. However, in some scenarios, not all notified parties expect to receive the event notification concurrently. For example, in the above subscription request for manhole cover movement, the notified parties may include different levels of municipal management departments, such as a street manhole cover management center, an area manhole cover management center, a district manhole cover management center, and a municipal manhole cover management center. These different levels of manhole cover management centers on the one hand want to be able to receive the event notification of manhole cover movement, and on the other hand do not wish to receive all event notifications concurrently. For example, a notified party, which serves as the subordinate management center, may be used to handle the manhole cover movement event in time after receiving the event notification, and a notified party, which serves as the superior management center, may be used to supervise and manage handling of the manhole cover movement event. At this time, the superior management center only wants to receive the event notification when the subordinate management center fails to detail with the manhole cover movement event in time. The event notification rule in the prior art cannot satisfy the application requirement in similar situations. In addition, sending an event notification to all the notified parties concurrently will also cause information interference to the notified parties and cause waste of resources.

The present disclosure provides an event notification method for managing notified parties in a subscription request, thus realizing accurate transmission of event notification, improving notification efficiency, and avoiding information interference to the notified parties.

FIG. 1 illustrates a flow chart of an event notification method according to some embodiments of the present disclosure. First, in step S101, an event subscription request from a subscriber is received, wherein the event subscription request includes one or more notified parties. The subscriber may be an application entity connected to a universal service entity, it may, for example, send a subscription request to the service entity when needing certain data for operation, the subscription request may include a subscribed event or operation, and one or more notified parties that receive an event notification. In addition, the subscriber may be one or more, that is, there may be multiple subscribers sending an event subscription request to the universal service entity, so as to subscribe to event notification.

Next, in step S102, the one or more notified parties are divided into one or more groups, wherein each group of the plurality of groups includes one or more notified parties. According to some embodiments of the present disclosure, when the event subscription request includes a plurality of notified parties, after the universal service entity receives the subscription request, an information list of all the notified parties will be obtained, and the notified parties may be grouped based on type, level of the notified parties, content of the event notification, etc., for the purpose of more accurate event notification. According to other embodiments of the present disclosure, the universal service entity may also group the notified plurality of parties based on instructions of the subscriber. Alternatively, the universal service entity may also group the notified parties in other ways that are more conducive to improving the efficiency of event notification. It should be noted that the present disclosure makes no limitation to the manner of grouping. The case where one notification party is included in the event subscription request will be described in detail below in conjunction with the embodiments.

According to some embodiments of the present disclosure, the universal service entity may differentiate the plurality of groups in the list of notified parties. For example, the plurality of groups may be divided into a first group, a second group, a third group, and the like, and when an event notification is performed, a group that needs to be notified currently is determined, and the event notification is sent to the notified parties in the determined notification group. According to some embodiments of the present disclosure, the at least one group to which an event notification is to be sent may be determined based on an order of the plurality of groups. In the below, different groups may be denoted in a manner of using a first group, a second group, and a third group. It should be noted that the "first" and "second", "third" herein are only used to differentiate different groups, and do not indicate the order of event notification for the groups. In other words, when an event notification is made, the universal service entity may determine to first send an event notification to the notified parties in the first group, or may determine to first send an event notification to the notified parties in the second group or other groups, for example, sending an event notification to the notified parties in the third group. In addition, according to some embodiments of the present disclosure, the notified parties included in the different groups may be different or the same, that is, one notified party may be included in the first group, and may be also included in the second group, there are no limited thereto.

Next, in step S103, an event notification is sent to the notified parties in at least one group of the one or more groups. According to some embodiments of the present disclosure, the universal service entity may first determine whether an event notification rule is satisfied, and when the event notification rule is satisfied, an event notification is sent to the notified parties in the at least one group.

Figure 2:
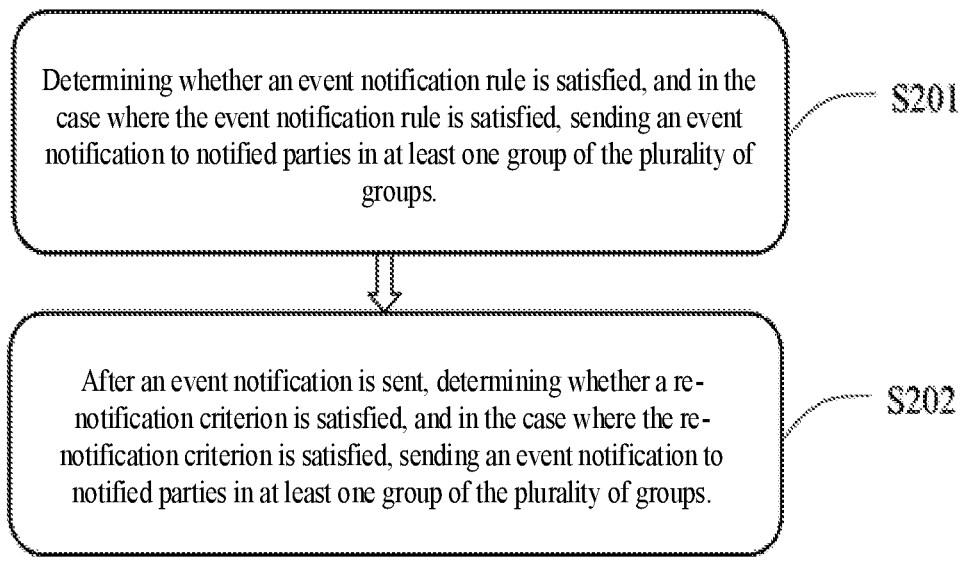
FIG. 2 illustrates a flow chart of sending an event notification according to some embodiments of the present disclosure.

FIG. 2 illustrates a flow chart of sending an event notification according to some embodiments of the present disclosure. According to some embodiments of the present disclosure, sending an event notification to notified parties in at least one group of the one or more groups comprises step S201: determining whether an event notification rule is satisfied, and in the case where the event notification rule is satisfied, sending an event notification to notified parties in at least one group of the plurality of groups. The event notification rule may be determined by the subscriber that sends the subscription request. The universal service entity may set the event notification rule by creating an event notification rule attribute based on the subscription request, and store address information of the plurality of subscribers based on the one or more groups by creating an event notification list attribute.

For example, in an example according to the present disclosure, the event subscription request may be used to request receipt of an update data notification from an application entity 1 and to set an event notification rule for receiving the notification, e.g., the update data is greater than a first threshold. The universal service entity may create an event notification rule attribute and an event notification list attribute corresponding to the subscription request after receiving the subscription request. After the universal service entity receives the update data from the application entity 1, it will determine whether the update data satisfies the event notification rule, and in the case where the event notification rule is satisfied (i.e., the update data is greater than the first threshold), the update data or the update information related to the update data is sent to the notified parties in at least one group of the one or more groups stored in the event notification list attribute.

According to some embodiments of the present disclosure, sending an event notification to notified parties in at least one group of the one or more groups further comprises step S202: after an event notification is sent, determining whether a re-notification criterion is satisfied, and in the case where the re-notification criterion is satisfied, sending an event notification to notified parties in at least one group of the one or more groups. According to some embodiments of the present disclosure, a group to which an event notification is sent (step S201) in the case where the event notification rule is satisfied is denoted as an initial-notification group, and a group to which an event notification is sent (step S202) in the case where the re-notification criterion is satisfied is denoted as a re-notification group, the initial-notification group is different from the re-notification group. According to other embodiments of the present disclosure, the initial-notification group and the re-notification group may also be the same or partially same.

For example, in the above example of receiving a subscription request for update data, after receiving the update data of the application entity 1, the universal service entity determines that the update data satisfies the event notification rule and sends an event notification to the initial-notification group (e.g. the first group). After sending the event notification, the universal service entity will also determine whether a re-notification criterion is satisfied, and if the re-notification criterion is satisfied, an event notification will be sent to the notified parties in the re-notification group (e.g., the second group).

According to some embodiments of the present disclosure, the step S202 may further comprise: determining whether there is a notified party to which the event notification is not sent before determining whether the re-notification criterion is satisfied, in the case that there is a notified party to which the event notification is not sent, determining whether or not the re-notification criterion is satisfied.

In the following, the re-notification criterion will be described in detail.

According to some embodiments of the present disclosure, determining whether a re-notification criterion is satisfied may comprise: determining, at a time point determined by a check event notification interval, whether an event notification rule is satisfied, and in the case where the event notification rule is satisfied, determining that the re-notification criterion is satisfied. For example, the universal service entity may set a time interval for determining whether an event notification rule is satisfied by creating a check event notification interval attribute. For example, the check event notification interval attribute may determine the check event notification interval as 4 hours, i.e., after the universal service entity sends an event notification (e.g., sending an event notification to the notified parties in the first group), it is checked every 4 hours whether the event notification rule is satisfied. In this embodiment, determining whether the event notification rule is satisfied at a time point determined by the check event notification interval may be taken as the re-notification criterion. In the case where the event notification rule is satisfied, it is determined that the re-notification criterion is satisfied, an event notification is sent to the notified parties in at least one group of the one or more groups (e.g., to the notified parties in the second group).

According to some embodiments of the present disclosure, determining whether a re-notification criterion is satisfied may comprise: determining, at a time point determined by a send notification interval, whether an event notification rule is satisfied, and in the case where the event notification rule is satisfied, determining that the re-notification criterion is satisfied. For example, the universal service entity may set a time interval at which an event notification is sent by creating a send notification interval attribute. For example, the send notification interval attribute may determine the send notification interval as 5 hours, that is, after sending an event notification (e.g., sending an event notification to the notified parties in the first group), the universal service entity checks every 5 hours whether the event notification rule is satisfied, and an event notification is sent in the case where the event notification rule is satisfied. In these embodiments, determining whether the event notification rule is satisfied at a time point determined by the send event notification interval may be taken as the re-notification criterion. If the universal service entity determines that the event notification rule is satisfied at the time point determined by the send event notification interval, it is considered that the re-notification criterion is satisfied, an event notification is sent to the notified parties in at least one group of the one or more groups (e.g., to the notified parties in the second group).

According to some embodiments of the present disclosure, at a time interval determined by the send notification interval, it is determined that the re-notification criterion is satisfied. In other words, in these embodiments, arriving at a time point determined by the send notification interval is taken as a condition for determining that the re-notification criterion is satisfied. For example, the universal service entity may set a time interval at which an event notification is sent by creating a send notification interval attribute. Exemplarily, the send notification interval attribute may determine the send notification interval as 4 hours, that is, after sending an event notification (e.g., sending an event notification to the notified parties in the first group), the universal service entity triggers an action of sending an event notification (e.g., to the notified parties in the second group) every 4 hours. That is, the universal service entity determines that the re-notification criterion is satisfied at a time point determined by the send event notification interval, and then sends an event notification to the notified parties in at least one group of the one or more groups (e.g., to the notified parties in the second group).

According to some embodiments of the present disclosure, the event notification method may comprise setting a send notification interval and a check event notification interval, wherein the send notification interval is greater than the check event notification interval. In these embodiments, determining whether a re-notification criterion is satisfied may comprise: determining, at a time point determined by the check event notification interval, whether an event notification rule is satisfied, and in the case where the event notification rule is satisfied, waiting for an event notification to be sent, determining, at a time point determined by the send notification interval, that the re-notification criterion is satisfied, and sending an event notification to the notified parties in at least one group of the one or more groups.

Figure 3A:
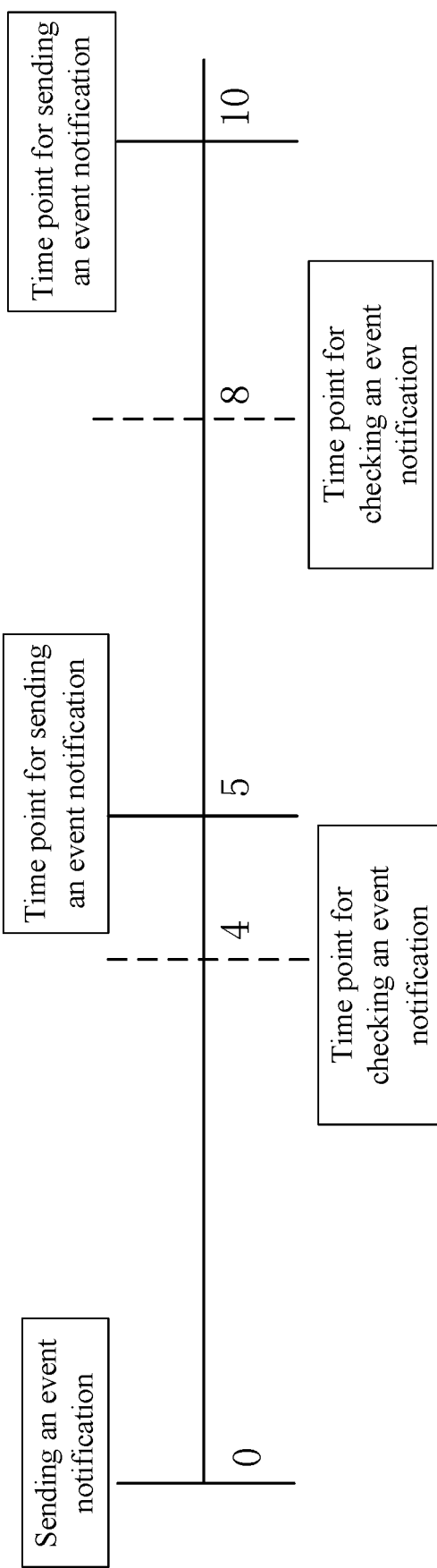
FIG. 3A illustrates a schematic diagram of setting the send notification interval to be greater than the check event notification interval according to some embodiments of the present disclosure.

FIG. 3A illustrates a schematic diagram of setting the send notification interval to be greater than the check event notification interval according to some embodiments of the present disclosure. Next, the flow of determining the re-notification criterion in these embodiments will be described in detail in conjunction with FIG. 3A. It should be noted that, in the specific embodiment illustrated in FIG. 3A, the event subscription request includes a plurality of notification parties, and the plurality of notification parties are divided into one or more groups.

For example, the universal service entity may set a time interval at which an event notification is sent by creating a send notification interval attribute. For example, the send notification interval attribute may determine the send notification interval as 5 hours. In addition, the universal service entity may set a time interval for a check event notification by creating a check event notification interval attribute. For example, the check event notification interval attribute may determine the check notification interval as 4 hours. That is, the send notification interval is set to be larger than the check event notification interval.

The horizontal axis in FIG. 3A may represent a time axis, for example, a time point at which the universal service entity sends an event notification to notified parties in the initial-notification group may be denoted as a starting point of the time axis. Accordingly, the universal service entity sets a time point every 4 hours from the starting point as time point for checking whether the event notification rule is satisfied, and sets a time point every 5 hours from the starting point as a time point for sending an event notification.

In these embodiments, as shown in FIG. 3A, since the send notification interval is greater than the check event notification interval, after sending the event notification (i.e., the starting point of the time axis), the universal service entity first arrives at the check event notification time point, and determines whether an event notification rule is satisfied. If the event notification rule is not satisfied, for example, the update data is less than or equal to the first threshold, the universal service entity will end this event notification operation. If the universal service entity determines that the event notification rule is satisfied, for example, the update data is greater than the first threshold, the universal service entity waits to send an event notification, an event notification is not sent at this check event notification time point (e.g., at 4 hours), the universal service entity sends an event notification to the notified parties in at least one group of the plurality of groups (e.g., the re-notification group) until arriving at a time point determined by the send notification interval (e.g., at 5 hours). As described above, the universal service entity may determine the re-notification groups based on the order of the group or other manners, and the re-notification group may be different from the initial-notification group, details are not described herein again.

Next, as shown in FIG. 3A, the universal service entity will wait for the next check event notification time point (e.g., at 8 hours), and determines, at this time point, whether or not the event notification rule is satisfied, and when the event notification rule is satisfied, the event notification is sent to the notified parties in at least one group of the plurality of groups (e.g., another re-notification group) at the next send event notification time point (e.g., at 10 hours), and so on, and so forth. In some embodiments according to the present disclosure, the another re-notification group may be different from the aforesaid re-notification group or the initial-notification group.

According to some embodiments of the present disclosure, the event notification method may comprise: setting a send notification interval and a check event notification interval, wherein the send notification interval is smaller than the check event notification interval. In these embodiments, determining whether a re-notification criterion is satisfied may comprise: determining, at a time point determined by the send notification interval, that a re-notification criterion is satisfied. Determining whether a re-notification criterion is satisfied may further comprise: determining, at a time point determined by the check event notification interval, whether an event notification rule is satisfied, and in the case where the event notification rule is satisfied, waiting for an event notification to be sent, and sending, at a time point determined by the send notification interval, an event notification to notified parties in at least one group of the plurality of groups.

Figure 3B:
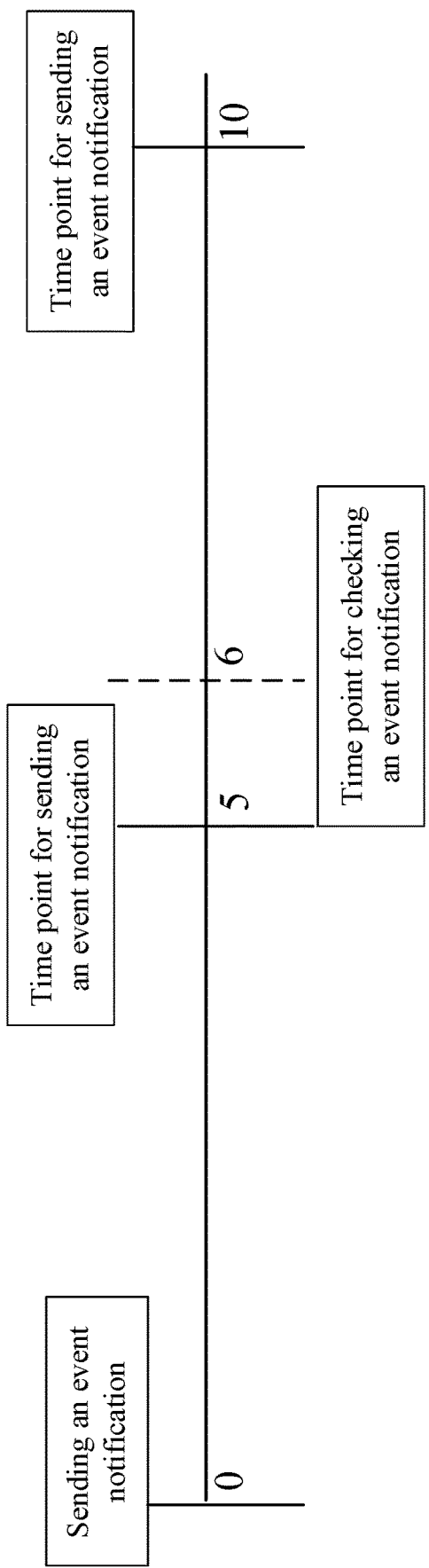
FIG. 3B illustrates a schematic diagram of setting the send notification interval to be smaller than the check event notification interval according to some embodiments of the present disclosure.

FIG. 3B illustrates a schematic diagram of setting the send notification interval to be smaller than the check event notification interval according to some embodiments of the present disclosure. In the following, a flow of determining a re-notification criterion in this embodiment will be described in detail with reference to FIG. 3B. It should be noted that, in the specific embodiment illustrated in FIG. 3B, the event subscription request includes a plurality of notification parties, and the plurality of notification parties are divided into one or more groups.

For example, the universal service entity may create a send notification interval attribute and a check event notification interval attribute, and set the send notification interval to be less than the check event notification interval. For example, the send notification interval attribute may determine the send notification interval as 5 hours, and the check event notification interval attribute may determine the check notification interval as 6 hours. That is, the send notification interval is set as smaller than the check event notification interval.

The horizontal axis in FIG. 3B may represent a time axis, for example, a time point at which the universal service entity sends an event notification to notified parties in the initial-notification group may be denoted as a starting point of the time axis. Accordingly, the universal service entity sets a time point every 6 hours from the starting point as a time point for checking whether the event notification rule is satisfied, and sets a time point every 5 hours from the starting point as a time point for sending an event notification.

In this embodiment, as shown in FIG. 3B, since the send notification interval is smaller than the check event notification interval, after sending the event notification (i.e., the time axis starting point), the universal service entity first arrives at the check event notification time point (i.e., the 5 hours), the universal service entity determines arriving at the notification event time point as satisfying the re-notification criterion, and sends an event notification to the notified parties in at least one group of the plurality of groups (e.g., the re-notification group). At a time point when arriving at the check event notification interval (e.g., at 6 hours), the universal service entity determines whether an event notification rule is satisfied, and in the case where the event notification rule is satisfied, it waits for the event notification to be sent, and sends the event notification to the notified parties in at least one group of the plurality of groups (e.g., another re-notification group) when arriving at the time point for sending a notification (e.g., at 10 hours). In some embodiments according to the present disclosure, the another re-notification group may be different from the aforesaid re-notification group or the initial-notification group.

According to some embodiments of the present disclosure, in a case where the check event notification interval attribute is created, the universal service entity may further create a check event notification interval enable attribute corresponding to the check event notification interval attribute, used for setting whether to enable or disable the check event notification interval attribute.

According to the event notification method provided by the present disclosure, by grouping the notified parties in the subscription request, event notification is performed based on grouping, the event notification is not sent to all the notified parties in the subscription request at one time, and the event notification process can be implemented by setting the send event notification interval and/or the check event notification interval, thereby realizing management on the notified parties in the subscription request, realizing accurate transmission of the event notification, improving the notification efficiency, and avoiding information interference with the notified parties.

Figure 4A:
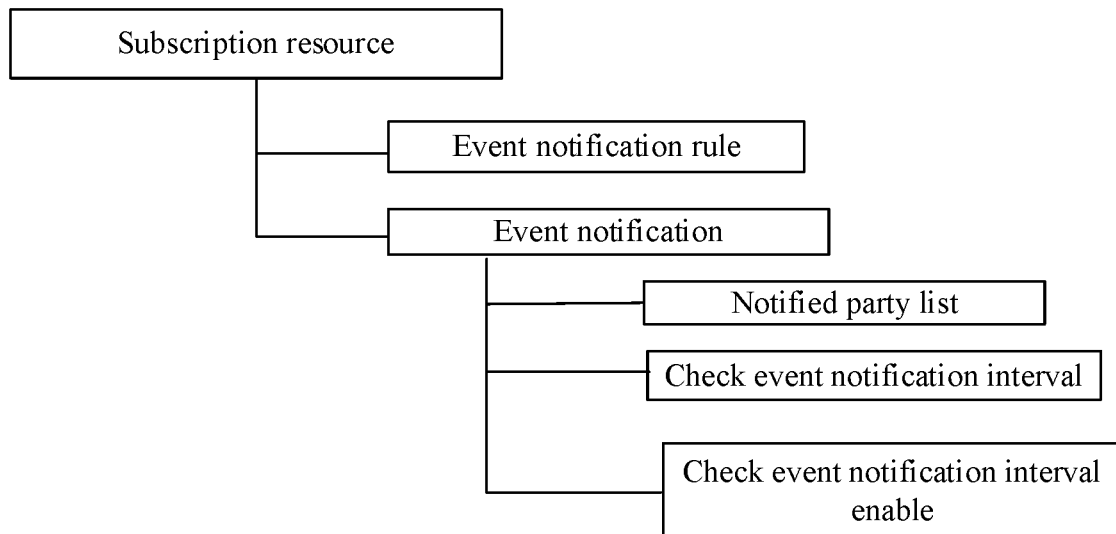
FIG. 4A illustrates a schematic diagram of a subscription resource structure for implementing an event notification method according to some embodiments of the present disclosure.
Figure 4B:
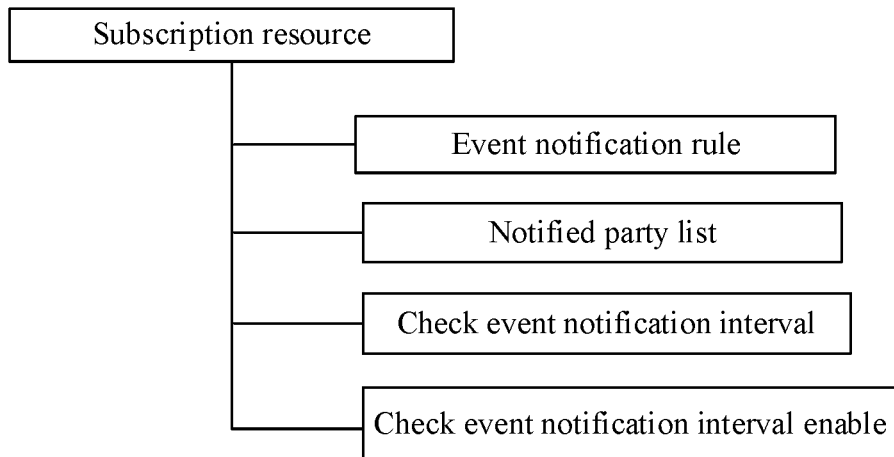
FIG. 4B illustrates another schematic diagram of the subscription resource structure shown in FIG. 4A.
Figure 5:
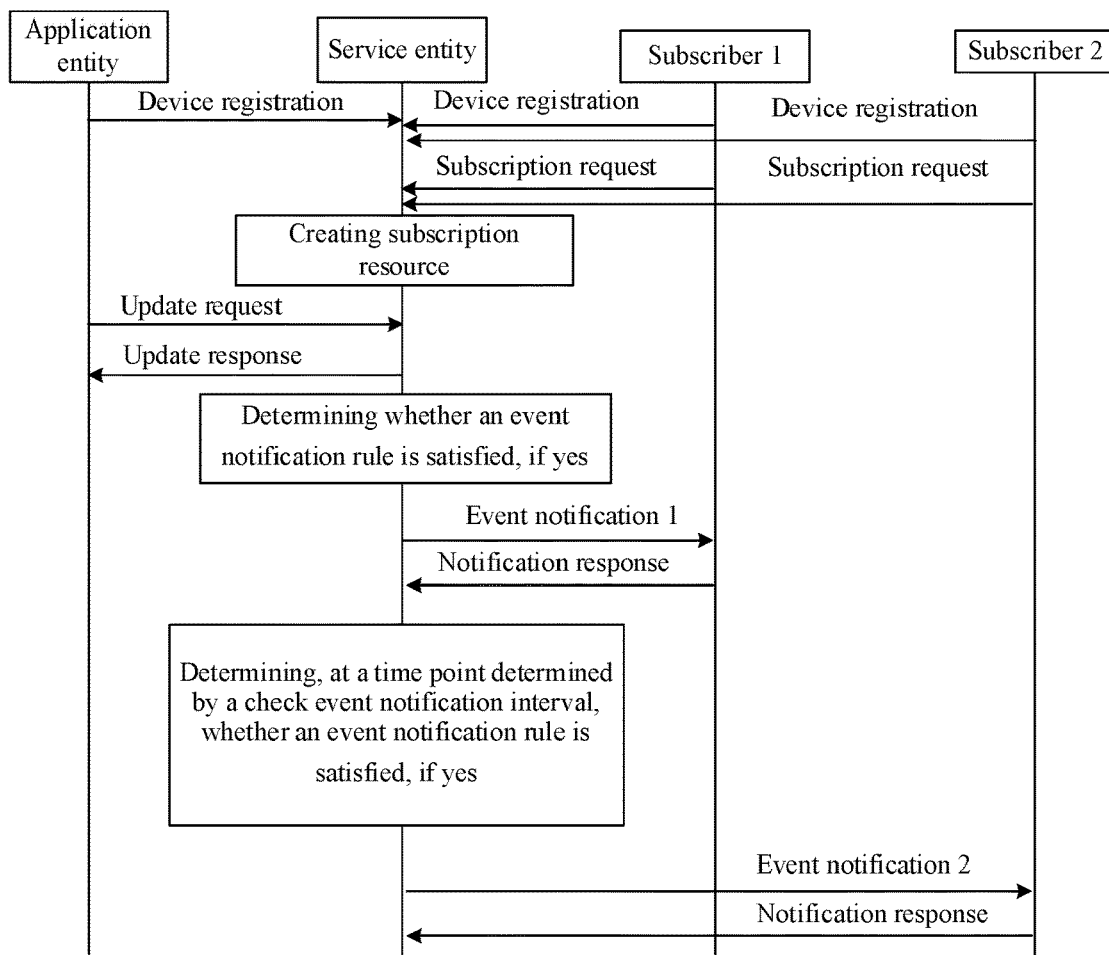
FIG. 5 illustrates a flow chart of an event notification method corresponding to the subscription resource structure shown in FIGS. 4A and 4B.

FIG. 4A illustrates a schematic diagram of a subscription resource structure for implementing an event notification method according to some embodiments of the present disclosure, FIG. 4B illustrates another schematic diagram of the subscription resource structure shown in FIG. 4A, FIG. 5 illustrates a flow chart of an event notification method corresponding to the subscription resource structure shown in FIGS. 4A and 4B. In the following, an event notification method according to some embodiments of the present disclosure and the embodiments thereof will be described in detail with reference to FIGS. 4A-4B and 5.

As shown in FIG. 5, the Internet of Things may be composed of a universal service entity (also referred to as a service entity) and a series of application entities, which may be various sensor devices or user terminals such as mobile phones, and may also be a software module or the like in the devices, such as a mobile phone application. The universal service entity manages its connected application entities and performs operations such as registration, data transfer, execution of tasks, and the like. For example, as shown in FIG. 5, the service entity receives device registration requests from an application entity, a subscriber 1 and a subscriber 2, thereby establishing an association relationship with the application entity, the subscriber 1 and the subscriber 2. In the application subscribing to the request, the subscriber (e.g., subscriber 1 and subscriber 2) may send an event subscription request to the service entity, the event subscription request includes a plurality of notified parties. For example, the subscription request may be used to request for receipt of update data from the application entity, and the subscription request may also be used to request the service entity to perform a certain operation process, details are not described herein.

After receiving the same subscription request from the subscriber 1 and the subscriber 2 respectively, the service entity will create a subscription resource corresponding to the subscription request. For example, the subscription request shown in FIG. 5 may be used to request an event notification of manhole cover movement, and the subscription request from the subscriber 1 and the subscriber 2 may include a plurality of notified parties, for example, the subscription request from the subscriber 1 includes a notified party A, a notified party B, and a notified party C. The subscription request from the subscriber 2 includes a notified party D, a notified party E, and a notified party F. Structure of the subscription resource may be as shown in FIG. 4A or 4B. As shown in FIG. 4B, the subscription resource may include an event notification rule attribute, a notified party list attribute, and a check event notification interval attribute, wherein in the subscription resource structure as shown in FIGS. 4A and 4B, the rounded-corner box represents the attribute. The subscription resource may further include a check event notification interval enable attribute for determining whether to enable the check event notification interval attribute. As shown in FIG. 4A, the subscription resource may include an event notification rule attribute. In addition, the subscription resource may further include an event notification resource for sending an event notification, wherein the square box represents the resource. The event notification resource may include sub-attributes, that is, a notified party list attribute, a check event notification interval attribute, and a check event notification interval enable attribute.

According to some embodiments of the present disclosure, the universal service entity divides the notified parties included in the subscription request into a plurality of groups, for example, divides the notified parties into 3 groups, and stores information of the notified parties in the notified party list based on the grouping. For example, the first group may include the notified party A, the notified party B, and the notified party C, the second group may include the notified party D and the notified party E, and the third group may include the notified party F. According to some embodiments of the present disclosure, different groups may be differentiated by a semicolon in the notified party list, for example, A, B, C; D, E; F.

In the above embodiment, the application entity in FIG. 5 may be a manhole cover movement sensor that can periodically send an update request to the service entity for update data of whether the detected manhole cover is moving. The service entity receives an update request from the application entity and sends an update response to the application entity, the application entity sends update data to the service entity based on the update response. After receiving the update data, the service entity may determine whether the update data satisfies an event notification rule, for example, whether a manhole cover movement event has occurred. If the service entity determines that the update data does not satisfy the event notification rule, for example, no manhole cover movement event has occurred, no event notification is sent to the notified parties. If the service entity determines that the update data satisfies the event notification rule, for example, a manhole cover movement event has occurred, the service entity may send an event notification 1 to the notified parties in the first group in the list of notified parties (i.e., the notified party A, the notified party B, and the notified party C). It should be noted that the subscriber 1 shown in FIG. 5 includes the notified party A, the notified party B, and the notified party C. It should be noted that the case where the above-mentioned subscriber 1 includes the notified party A, the notified party B, and the notified party C is merely illustrative. In other embodiments, the notified party A, the notified party B, and the notified party C may also be a device different from the subscriber 1, for example, the subscriber 1 is a device 1, the notified party A is a device 2, the notified party B is a device 3, and the notified party C is a device 4.

As shown in FIG. 5, after the event notification 1 is received by the subscriber 1 (including the notified party A, the notified party B, and the notified party C), a notification response corresponding to the event notification 1 may be sent to the service entity. In the subscription request of manhole cover movement, the notified party A, the notified party B, and the notified party C may be devices belonging to organization responsible for manhole cover safety management. The organization responsible for safety management of the manhole cover can timely deal with the event after receiving a notification of manhole cover movement, for example, checking the cause of manhole cover movement and returning the manhole cover in time to avoid occurrence of a dangerous event.

After sending the event notification 1, the service entity will determine whether a re-notification criterion is satisfied, and if the re-notification criterion is satisfied, an event notification 2 may be sent to the notified parties in at least one group of the plurality of groups, for example, the second group.

As shown in FIG. 5, the service entity may determine again whether an event notification rule is satisfied at a time point determined by the check event notification interval attribute, and in the case where the event notification rule is satisfied, for example, when the manhole cover has moved, it is determined that the re-notification criterion is satisfied. Next, the service entity will send the event notification 2 to the notified parties in at least one group of the plurality of groups, wherein the at least one group may be, for example, the second group, i.e., including the notified party D and the notified party E. For example, the notified party D and the notified party E may be devices belonging to an organization responsible for supervising management of the manhole cover. It is thus possible to separately send an event notification to the notified parties belonging to different groups based on the manhole cover movement event.

In these embodiments, after receiving the update data regarding manhole cover movement, the service entity first sends the event notification to the notified parties in the first group for rapidly dealing with the manhole cover movement event. After a period of time, that is, arriving at the time point determined by the check event notification interval, the service entity will again determine whether an event notification rule is satisfied, and if it is determined that the event notification rule of manhole cover movement is still satisfied, the service entity will send the event notification to the notified parties in the second group, for the aim of monitoring the event. At this time, the notified parties in the second group can know that the manhole cover movement event has occurred, and the notified parties in the first group fail to deal with this event within the check event notification interval, thereby achieving the purpose of the organization that supervises management of the manhole cover. If the service entity determines that the manhole cover movement event notification rule is not satisfied at the time point determined by the check event notification interval, the event notification will not be sent. In this case, it means that the notified parties in the first group have handled the manhole cover movement event after receiving the event notification and restored the manhole cover. At this time, the notified parties in the second group will not receive the event notification which is useless information, thereby reducing information interference to the notified parties in the second group, and reducing resource waste caused by sending event notification to all parties.

Further, in these embodiments, the service entity groups the notified parties based on responsibilities of the notified parties, and grouping may be performed in other manners according to other embodiments of the present disclosure.

In other embodiments according to the present disclosure, the service entity may adopt other manners to implement a determination as to whether the re-notification criterion is satisfied.

Figure 6A:
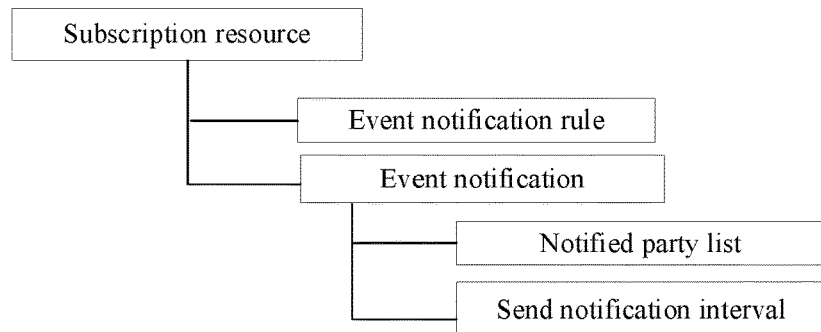
FIG. 6A illustrates a schematic diagram of a subscription resource structure for implementing an event notification method according to some embodiments of the present disclosure.
Figure 6B:
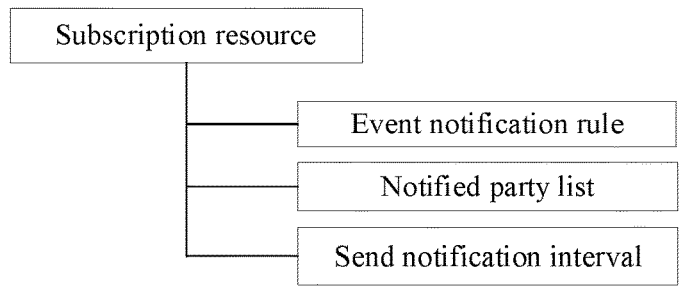
FIG. 6B illustrates another schematic diagram of the subscription resource structure shown in FIG. 6A.
Figure 7:
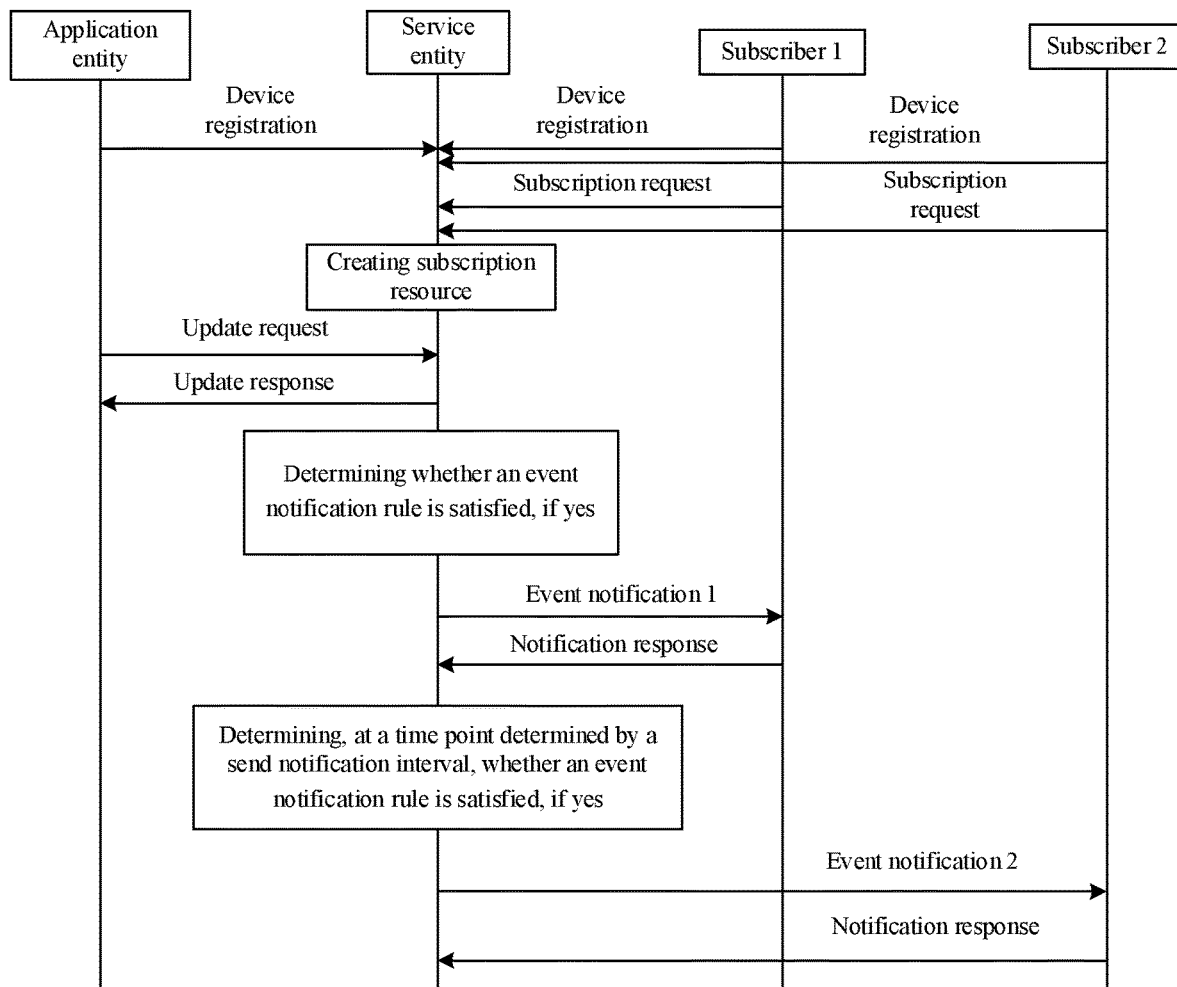
FIG. 7 illustrates a flow chart of an event notification method corresponding to the subscription resource structure shown in FIGS. 6A and 6B.

FIG. 6A illustrates a schematic diagram of a subscription resource structure for implementing an event notification method according to some embodiments of the present disclosure, FIG. 6B illustrates another schematic diagram of the subscription resource structure shown in FIG. 6A, FIG. 7 illustrates a flow chart of an event notification method corresponding to the subscription resource structure shown in FIGS. 6A and 6B.

In the following, an event notification method according to some embodiments of the present disclosure and embodiments thereof will be described in detail with reference to FIGS. 6A-6B and 7.

In the above embodiments according to the present disclosure, after receiving the subscription request from the subscriber 1 and the subscriber 2 respectively, the service entity will create a subscription resource corresponding to the subscription request. Structure of the subscription resource may be as shown in FIG. 6A or 6B. As shown in FIG. 6B, the subscription resource may include an event notification rule attribute, a notified party list attribute, and a send notification interval attribute. The send notification interval attribute is used to set a time interval for sending an event notification. As shown in FIG. 6A, the subscription resource may further include an event notification resource for sending an event notification. The notified party list attribute and the send notification interval attribute are used as sub-attributes of the event notification resource. Implementation of the subscription request shown in FIG. 7 is similar to the manner described in FIG. 5, and details will not be described again herein.

In the flowchart shown in FIG. 7, the service entity implements a determination as to whether or not the re-notification criterion is satisfied based on the send notification interval attribute shown in FIG. 6A or 6B. The service entity determines whether an event notification rule is satisfied at a time point determined by the send notification interval attribute, and in the case where the event notification rule is satisfied, it determines that the re-notification criterion is satisfied and sends an event notification 2 to the notified parties in the second group stored in the notified party list, thereby sending the event notification to different notified parties in stages.

Figure 8A:
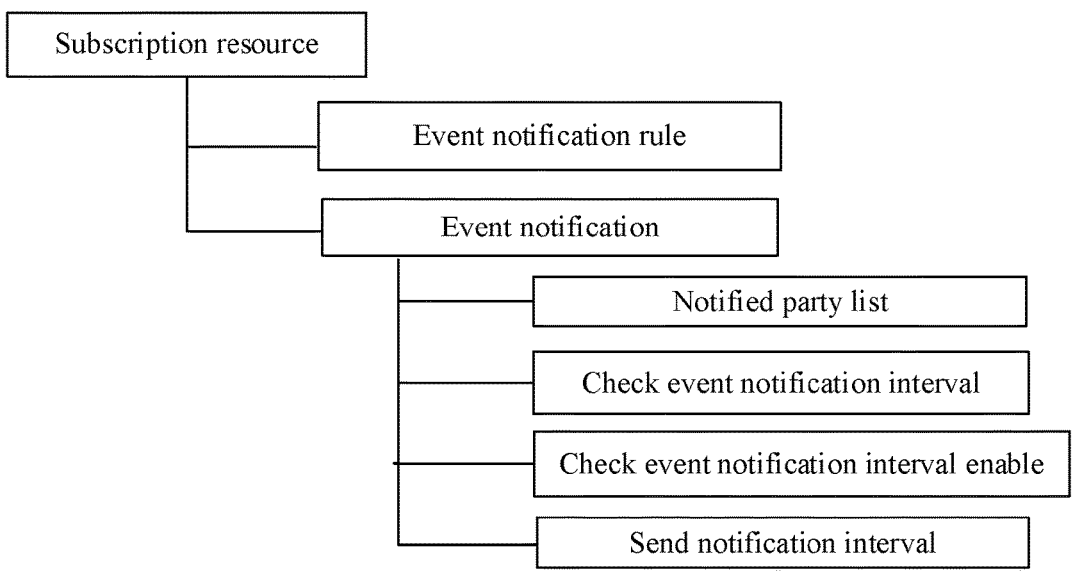
FIG. 8A illustrates a schematic diagram of a subscription resource structure for implementing an event notification method according to some embodiments of the present disclosure.
Figure 8B:
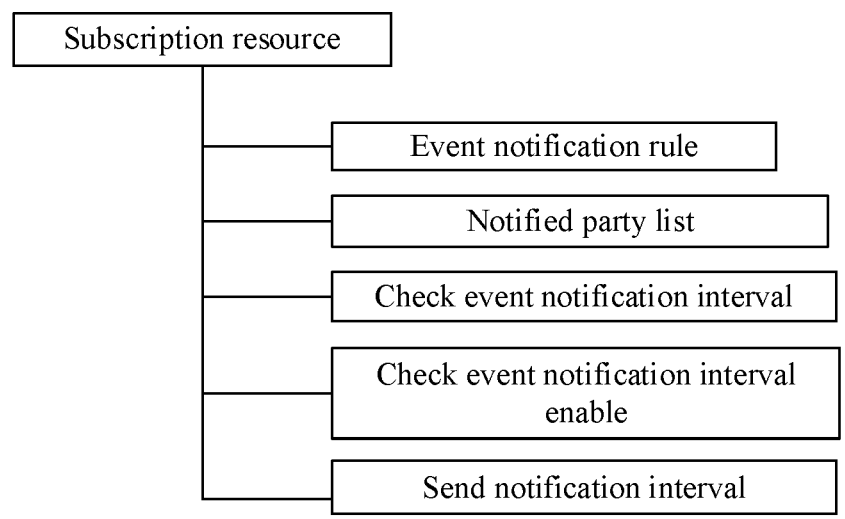
FIG. 8B illustrates another schematic diagram of the subscription resource structure shown in FIG. 8A.
Figure 9A:
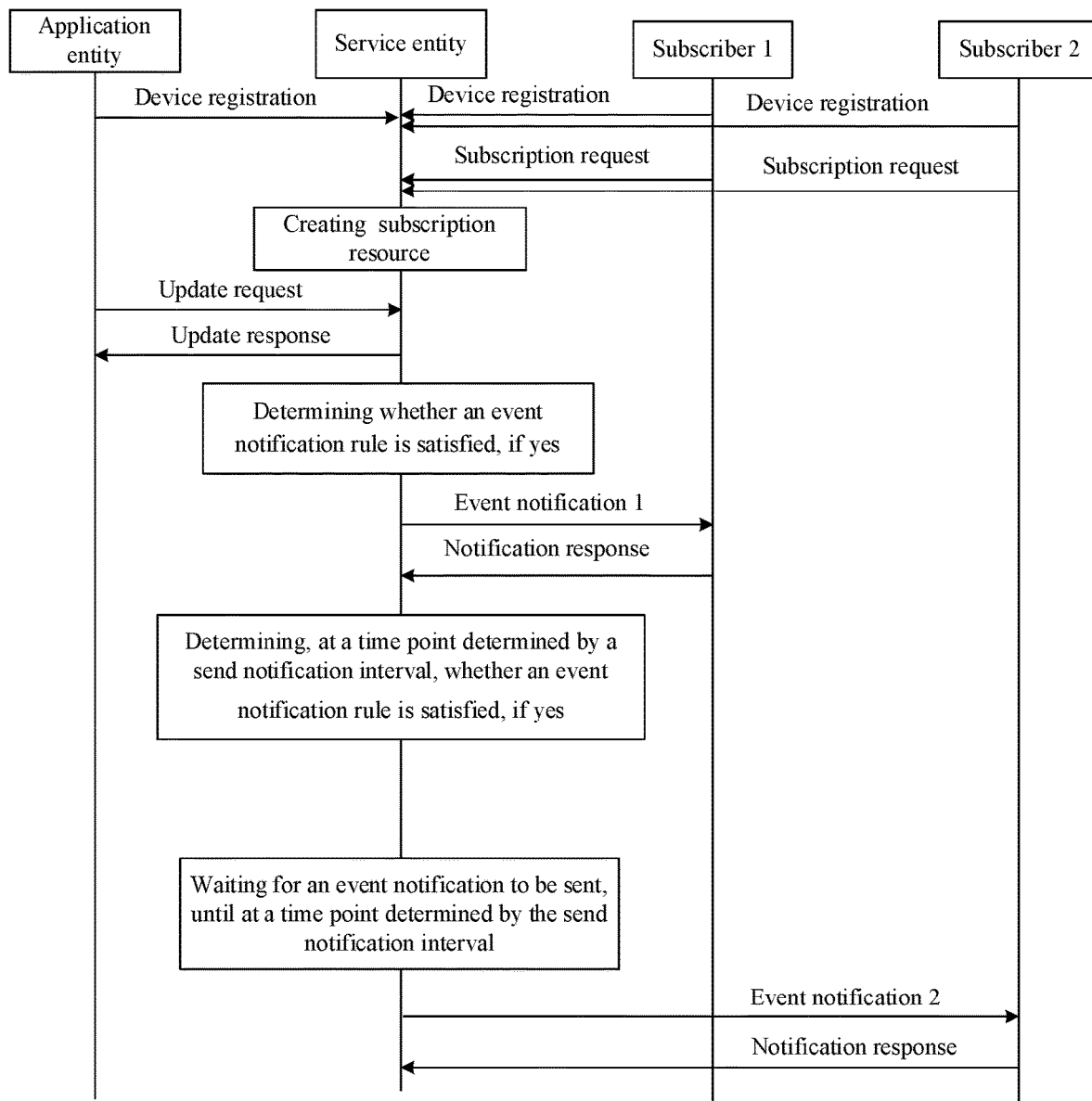
FIG. 9A illustrates a flow chart of an event notification method corresponding to the subscription resource structure shown in FIGS. 8A and 8B.
Figure 9B:
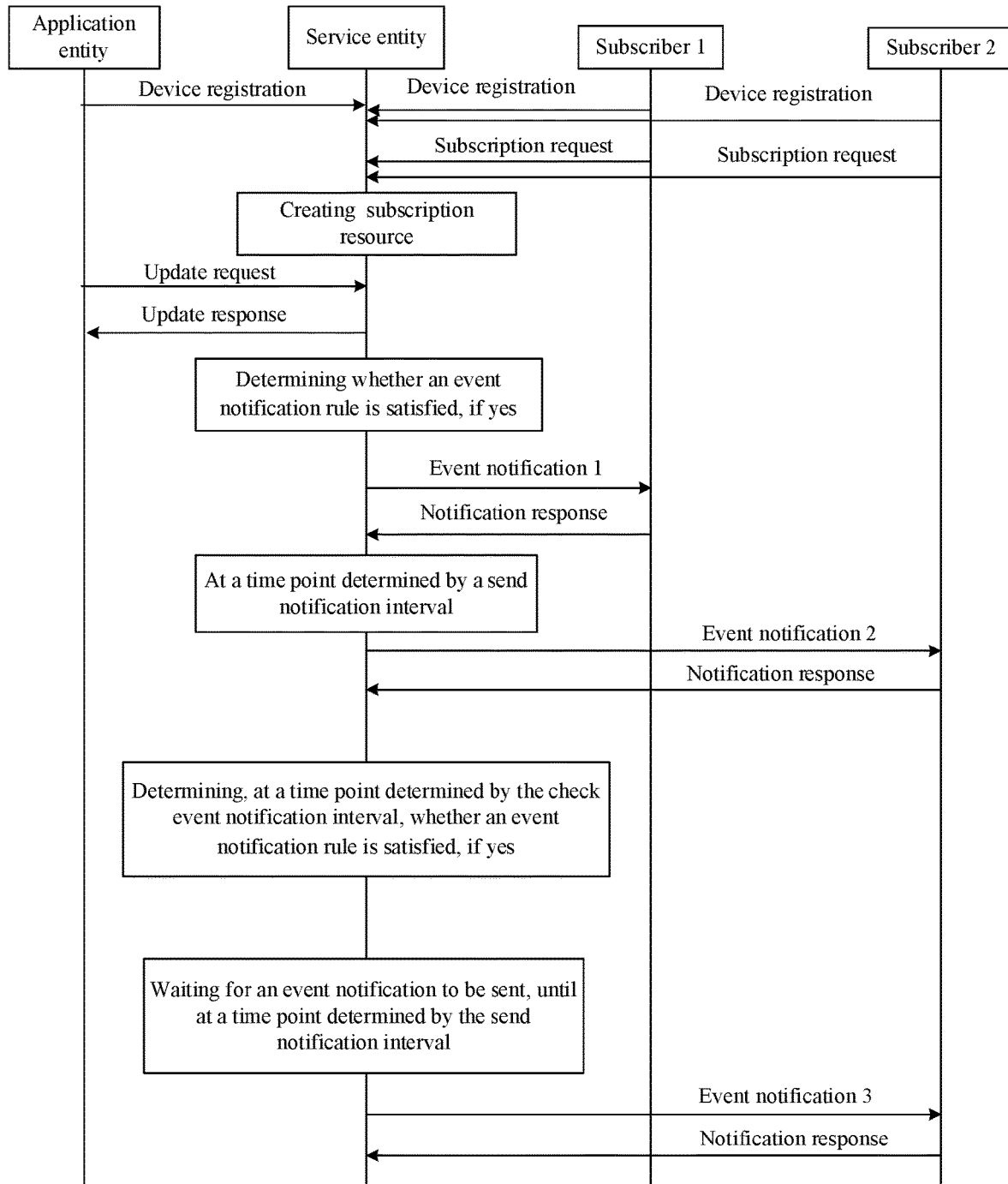
FIG. 9B illustrates another flow chart of an event notification method corresponding to the subscription resource structure shown in FIGS. 8A and 8B.

FIG. 8A illustrates a schematic diagram of a subscription resource structure for implementing an event notification method according to some embodiments of the present disclosure, FIG. 8B illustrates another schematic diagram of the subscription resource structure shown in FIG. 8A, FIG. 9A illustrates a flow chart of an event notification method corresponding to the subscription resource structure shown in FIGS. 8A and 8B, FIG. 9B illustrates another flow chart of an event notification method corresponding to the subscription resource structure shown in FIGS. 8A and 8B. In the following, an event notification method of some embodiments of the present disclosure and the embodiments thereof will be described in detail in conjunction with FIGS. 8A-8B and. 9A-9B.

As shown in FIG. 8B, the service entity may include an event notification rule attribute, a notified party list attribute, a check event notification interval attribute, and a send notification interval attribute in the subscription resource created after receiving the subscription request. The subscription resource may further include a check event notification interval enable attribute for determining whether to enable the check event notification interval attribute. As shown in FIG. 8A, the subscription resource may further include an event notification resource for sending an event notification. The notified party list attribute, the check event notification interval attribute, the send notification interval attribute, and the check event notification interval attribute may be used as sub-attributes of the event notification resource.

In the above embodiments according to the present disclosure, the send notification interval attribute and the check event notification interval attribute may be used to set the send notification interval to be larger than the check event notification interval, and a schematic diagram of the time interval may be as shown in FIG. 3A. In these embodiments, determining whether a re-notification criterion is satisfied comprises: determining, at a time point determined by the check event notification interval, whether an event notification rule is satisfied, and in the case where the event notification rule is satisfied, determining that a re-notification criterion is satisfied, waiting for an event notification to be sent, determining, at a time point determined by the send notification interval, that the re-notification criterion is satisfied, and sending an event notification 2 to notified parties in at least one group of the plurality of groups, for example, the notified parties in the second group.

As shown in FIG. 9B, the service entity may set the send notification interval to be smaller than the check event notification interval by using the send notification interval attribute and the check event notification interval attribute illustrated in FIG. 8A or 8B, a schematic of the time interval is shown in FIG. 3B. In these embodiments, determining whether a re-notification criterion is satisfied comprises: determining, at a time point determined by the send notification interval, that the re-notification criterion is satisfied, and sending an event notification 2 to at least one group of the plurality of groups, for example, the notified parties in the second group (i.e., the notified party D and the notified party E). After receiving the event notification 2, the notified parties in the second group may send a notification response corresponding to the event notification 2 to the service entity.

In these embodiments, the service entity may further determine whether the event notification rule is satisfied at a time point determined by the check event notification interval, and wait for the event notification to be sent if the event notification rule is satisfied, and at a time point determined by the send notification interval, an event notification 3 is sent to at least one group of the plurality of groups, for example, a notified party (i.e., notified party F) in the third group. After receiving the event notification 3, the notified parties in the third group may send a notification response corresponding to the event notification 3 to the service entity.

In the above embodiments according to the present disclosure, the service entity may further determine whether there is a notified party to which an event notification is not sent after sending the event notification 1 (or the event notification 2), if it is determined that there is no such notified party, that is, the notified parties in the notified party list have all received the event notification, then the service entity no longer determine whether the re-notification criterion is satisfied.

According to the event notification method provided by the present disclosure, by grouping the notified parties in the subscription request, event notification is performed based on grouping, the event notification is not sent to all the notified parties in the subscription request at one time, and the event notification process can be implemented by setting the send notification interval and/or the check event notification interval, thereby realizing management on the notified parties in the subscription request, realizing accurate transmission of the event notification, improving the notification efficiency, and avoiding information interference with the notified parties.

According to some embodiments of the present disclosure, the event subscription request may include only one notified party, and the only one notified party may be divided into one group, for example the fourth group. In this embodiment, sending an event notification to notified parties in at least one group of the one or more groups may include: determining whether the event notification rule is satisfied, and in the case where the event notification rule is satisfied, determining whether the re-notification criterion is satisfied. In other words, in the case where the event notification rule is satisfied, an event notification is not sent to the notified party of the fourth group, instead it is determined whether the re-notification criterion is satisfied, that is, implementing the operation of delaying the event notification.

According to some embodiments of the present disclosure, determining whether the re-notification criterion is satisfied may comprise: determining, at a time point determined by the check event notification interval, whether the event notification rule is satisfied, and in the case where the event notification rule is satisfied, determining that the re-notification criterion is satisfied.

Figure 10A:
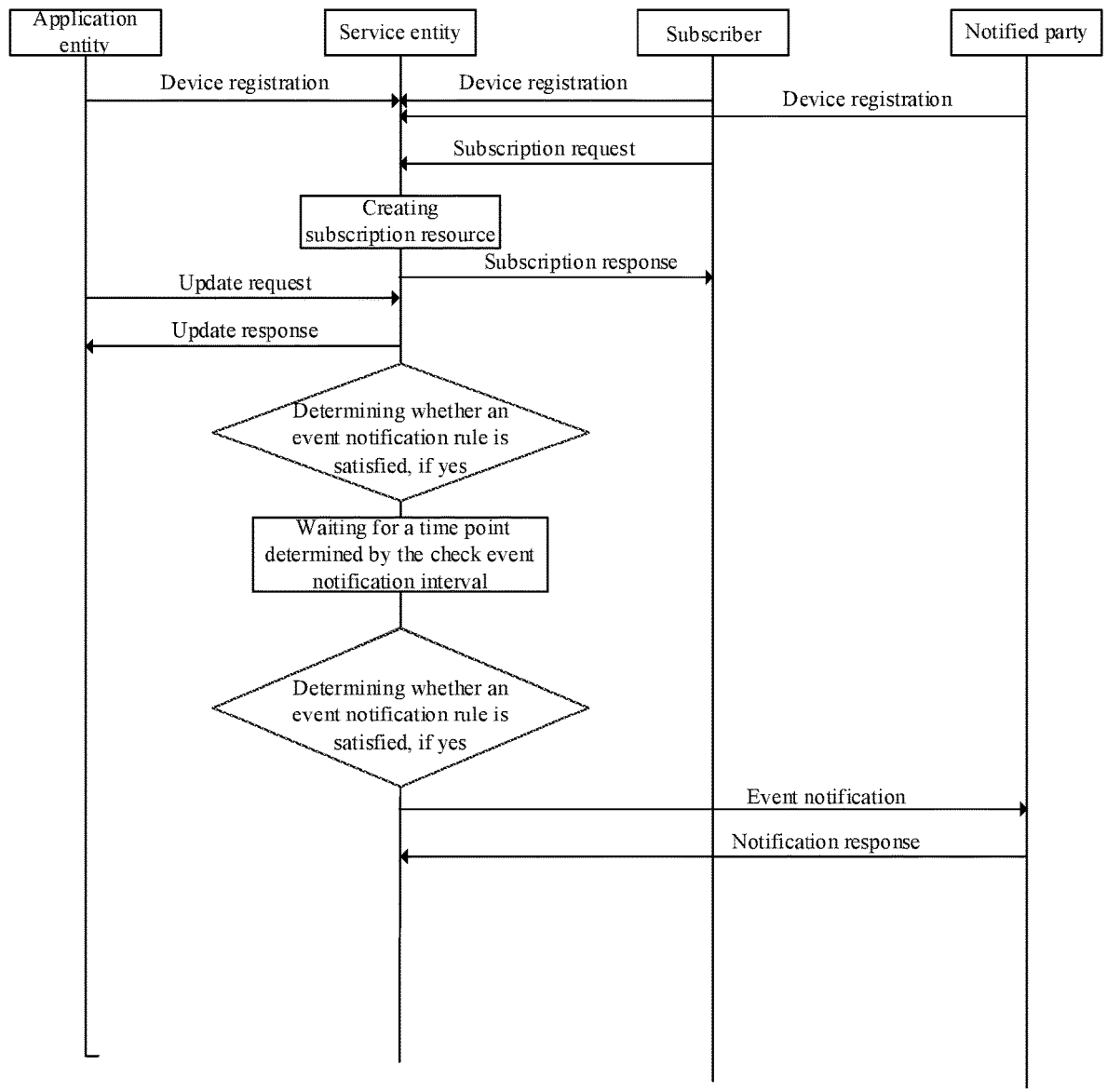
FIG. 10A illustrates a flow chart of sending an event notification to one notified party of the fourth group according to some embodiments of the present disclosure.

Specifically, FIG. 10A illustrates a flow chart of sending an event notification to one notified party of the fourth group according to some embodiments of the present disclosure. As shown in FIG. 10A, the subscriber, the notified party, and the application entity may achieve device registration in a manner of sending a device registration request to the service entity. Next, the subscriber may send a subscription request to the service entity. The subscription request may be a single-resource subscription request as described above, and the event subscription request may include one notified party, and may further include an event notification rule for determining whether to send an event notification and a re-notification criterion. The service entity creates a subscription resource based on the received subscription request, and may further send a subscription response to the subscriber of the subscription request.

The application entity may, for example, be a manhole cover movement sensor as described above, it can periodically send an update request to the service entity to update the detected data of whether the manhole cover has been moved. The service entity receives an update request from the application entity and sends an update response to the application entity; the application entity sends update data to the service entity based on the update response. After receiving the update data, the service entity may determine whether the update data satisfies the event notification rule.

In the case where it is determined that the update data satisfies the event notification rule, the service entity waits for a time point determined by the check event notification interval, upon arrival of the time point, the service entity re-determines whether the event notification rule is satisfied. If it is determined that the received update data still satisfies the event notification rule, the service entity sends an event notification to the notified party included in the subscription request, thereby implementing delayed sending of an event notification to the notified party of the fourth group.

According to some embodiments of the present disclosure, the event subscription request may include a plurality of notified parties, and in this case, the plurality of notified parties may also be divided into one group, for example, the fifth group. In this embodiment, the sending the event notification to the notified party in the at least one of the one or more groups may include: determining whether the event notification rule is satisfied, and determining the event notification rule, determining whether the re-notification criterion is satisfied, and when the re-notification criteria are satisfied, an event notification is sent to the notified party in the fifth group. In other words, in the case where it is determined that the event notification rule is satisfied, the event notification is not sent to the plurality of notified parties in the fifth group, and it determines that whether the re-notification criterion is satisfied, thereby, the effect of delaying the sending of the event notification to the plurality of notified parties of the fifth group is achieved.

Figure 10B:
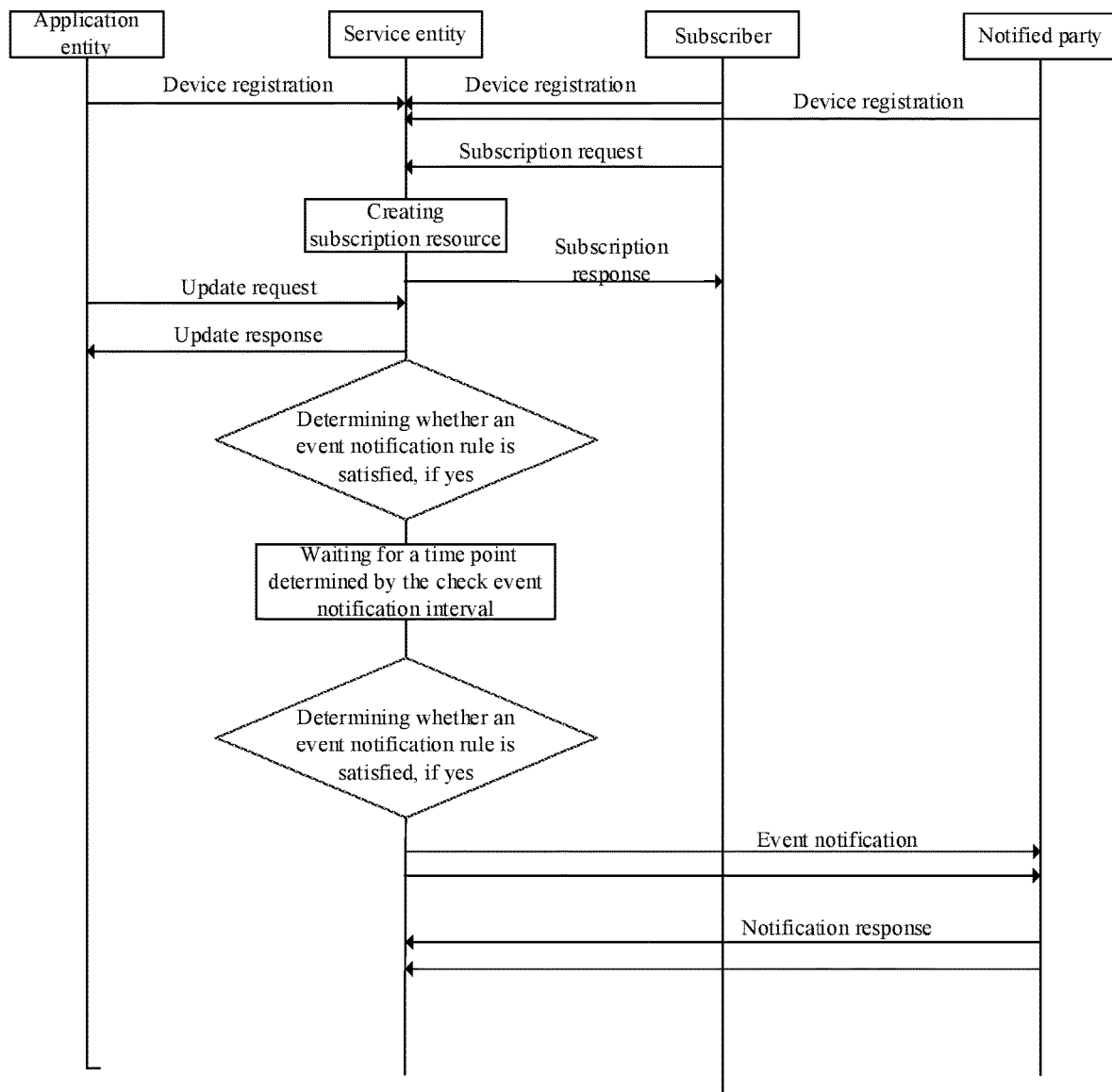
FIG. 10B illustrates a flow chart of sending an event notification to a plurality of notified parties of the fifth group according to some embodiments of the present disclosure.

FIG. 10B illustrates a flow chart of sending an event notification to a plurality of notified parties of the fifth group according to some embodiments of the present disclosure. As shown in FIG. 10B, the subscription request may include a plurality of notified parties, for example, two notified parties. The specific flow of the delayed event notification shown in FIG. 10B is similar to the flow shown in FIG. 10A, the description will not be repeated here. It should be noted that the two notified parties shown in FIG. 10B do not include the subscriber that sends the subscription request, this is merely exemplary, and the plurality of notified parties may also include the subscriber itself.

According to some embodiments of the present disclosure, the event subscription request may be at least one of a single-resource subscription request and a cross-resource subscription request. An implementation manner of the single-resource subscription request may be as shown in FIG. 5, FIG. 7, FIG. 9A or FIG. 9B in the above, that is, the subscriber requests to subscribe to update data of one application entity. The cross-resource subscription request may that a subscriber requests to subscribe to update data of a plurality of application entities.

Figure 11:
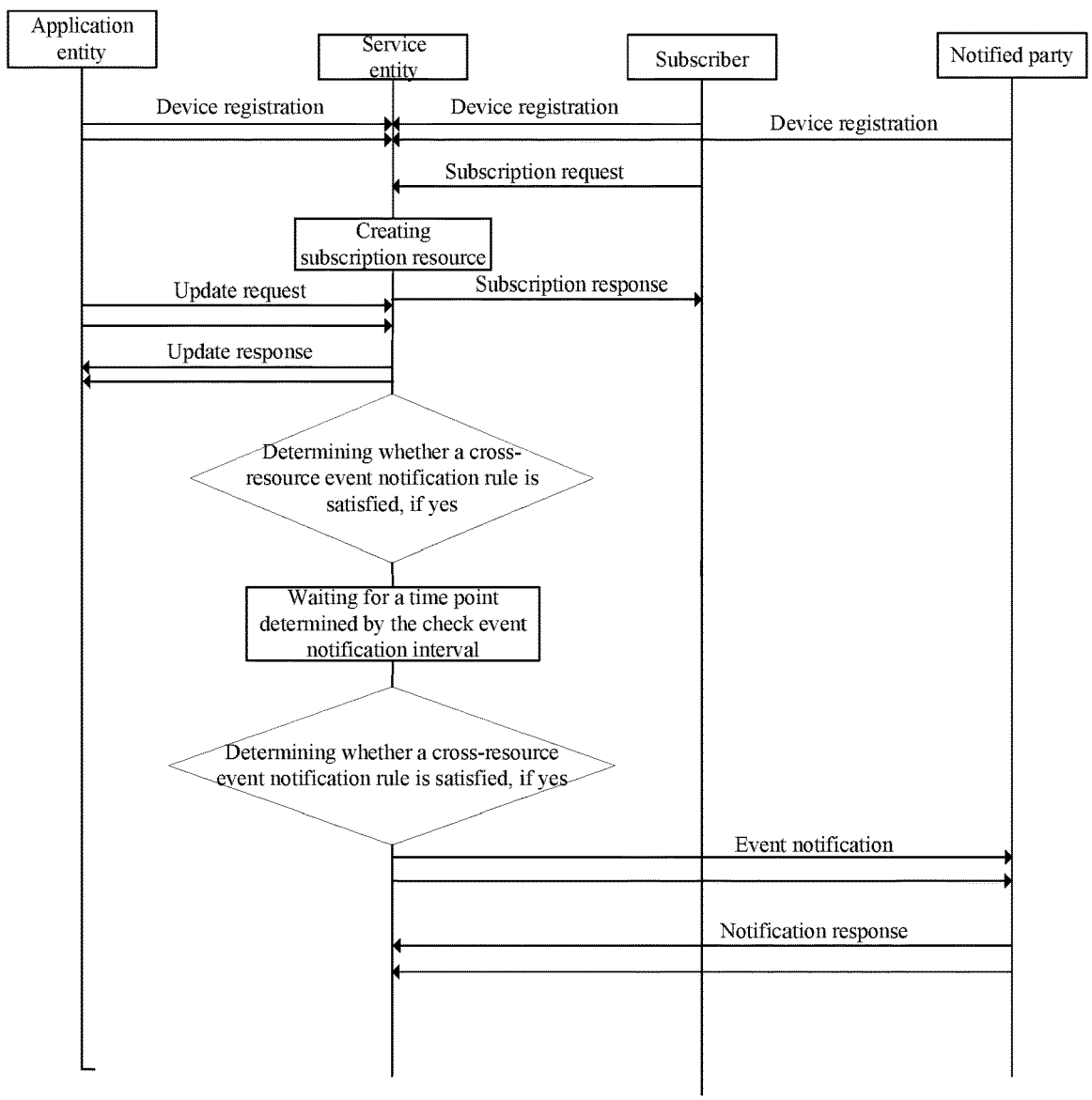
FIG. 11 illustrates a flow chart of cross-resource subscription in the event notification method according to some embodiments of the present disclosure.

FIG. 11 illustrates a flow chart of cross-resource subscription in the event notification method according to some embodiments of the present disclosure. As shown in FIG. 11, the subscription request is a cross-resource subscription request. In this case, the event notification rule may be further described as a cross-resource event notification rule. The service entity may determine whether the cross-resource event notification rule is satisfied after receiving update data of a plurality of application entities (only two application entities are shown in FIG. 11).

In the case where it is determined that the cross-resource event notification rule is satisfied, the service entity waits for a time point determined by the check event notification interval, upon arrival of the time point, the service entity re-determines whether the cross-resource event notification rule is satisfied. In the case where it is determined that the received update data still satisfies the cross-resource event notification rule, the service entity sends an event notification to one or more notified parties included in the subscription request, thereby implementing delayed sending of event notification to the one or more notified parties.

With the event notification delaying method according to the present disclosure, it is possible to not immediately send the event notification to one or more notified parties included in the subscription request in the case where the received update data satisfies the event notification rule, instead it waits for a time point determined by the check event notification interval, and upon arrival of this time point, it is re-determined whether the event notification rule is satisfied, and if it is determined that the event notification rule is satisfied, the event notification is send to the one or more notified parties.

Figure 14:
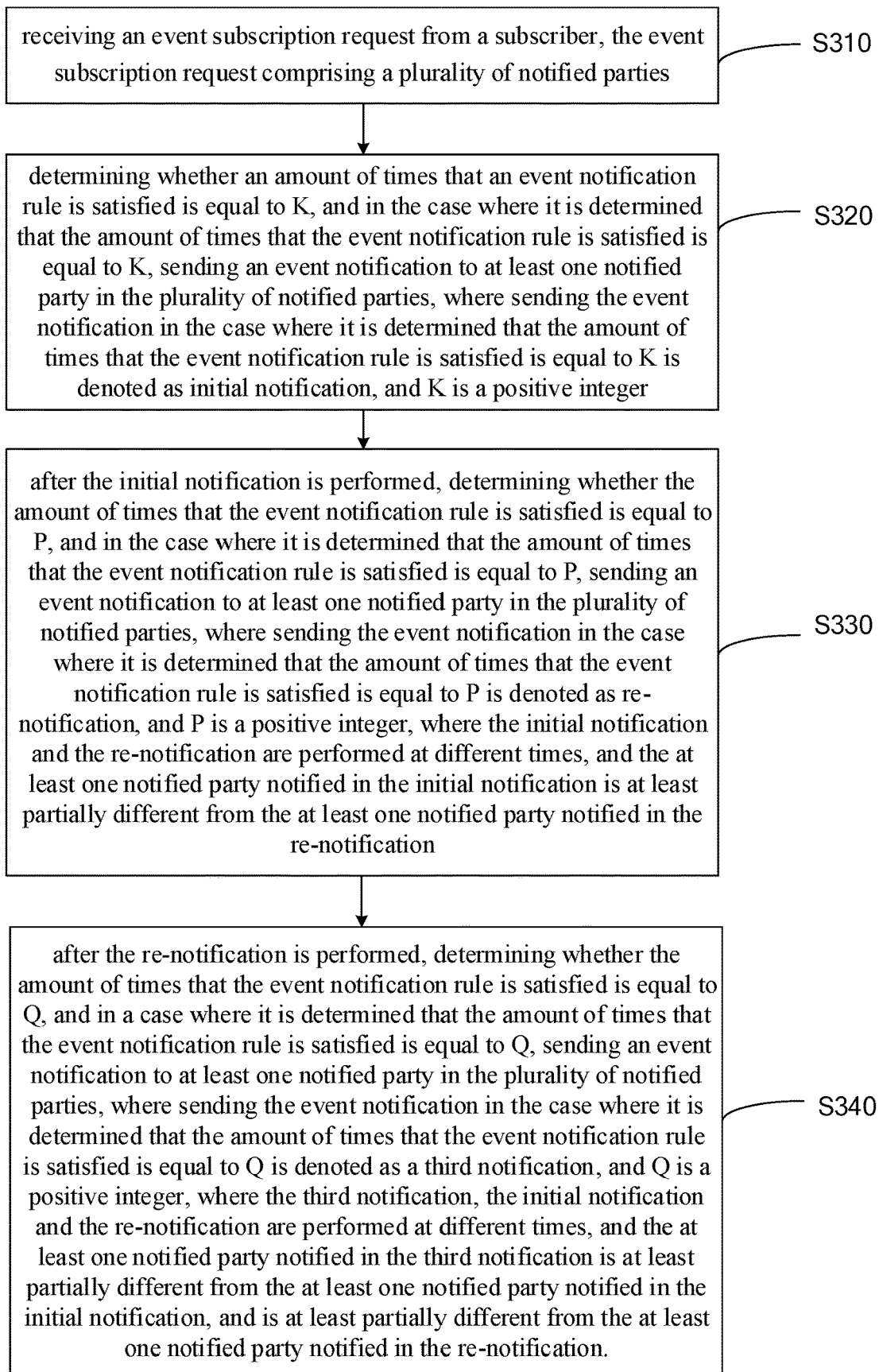
FIG. 14 illustrates a flow chart of an event notification method according to some embodiments of the present disclosure.

FIG. 14 illustrates a flow chart of an event notification method according to some embodiments of the present disclosure. Referring to FIG. 14, the method includes following steps S310-S330.

S310: receiving an event subscription request from a subscriber, the event subscription request comprising a plurality of notified parties;

S320: determining whether an amount of times that an event notification rule is satisfied is equal to K, and in the case where it is determined that the amount of times that the event notification rule is satisfied is equal to K, sending an event notification to at least one notified party in the plurality of notified parties, where sending the event notification in the case where it is determined that the amount of times that the event notification rule is satisfied is equal to K is denoted as initial notification, and K is a positive integer; and S330: after the initial notification is performed, determining whether the amount of times that the event notification rule is satisfied is equal to P, and in the case where it is determined that the amount of times that the event notification rule is satisfied is equal to P, sending an event notification to at least one notified party in the plurality of notified parties, where sending the event notification in the case where it is determined that the amount of times that the event notification rule is satisfied is equal to P is denoted as re-notification, and P is a positive integer, where the initial notification and the re-notification are performed at different times, and the at least one notified party notified in the initial notification is at least partially different from the at least one notified party notified in the re-notification.

In step S310, an event subscription request from a subscriber is received, and the event subscription request includes a plurality of notified parties. The subscriber may be an application entity connected to a universal service entity, it may, for example, send a subscription request to the service entity when needing certain data for operation, the subscription request may include a subscribed event or operation, and the notified parties that receive an event notification. In addition, the subscriber may be one or more, that is, there may be multiple subscribers sending an event subscription request to the universal service entity, so as to subscribe to event notification.

In some examples, the notified parties are divided into a plurality of groups. Each group of the plurality of groups includes at least one notified party. For example, when the event subscription request includes a plurality of notified parties, after the universal service entity receives the subscription request, an information list of all the notified parties will be obtained, and the notified parties may be grouped based on type, level of the notified parties, content of the event notification, etc., for the purpose of more accurate event notification. For example, the universal service entity may also group the notified plurality of parties based on instructions of the subscriber. Alternatively, the universal service entity may also group the notified parties in other ways that are more conducive to improving the efficiency of event notification. It should be noted that the present disclosure makes no limitation to the manner of grouping.

For example, the universal service entity may differentiate the plurality of groups in the list of notified parties. For example, the plurality of groups may be divided into a first group, a second group, a third group, and the like, and when an event notification is performed, a group that needs to be notified currently is determined, and the event notification is sent to the notified parties in the determined notification group. The group to which an event notification is to be sent may be determined based on an order of the plurality of groups. In the below, different groups may be denoted in a manner of using a first group, a second group, and a third group. It should be noted that the "first" and "second", "third" herein are only used to differentiate different groups, and do not indicate the order of event notification for the groups. In other words, when an event notification is made, the universal service entity may determine to first send an event notification to the notified parties in the first group, or may determine to first send an event notification to the notified parties in the second group or other groups, for example, sending an event notification to the notified parties in the third group. In addition, the notified parties included in the different groups may be different or the same, that is, one notified party may be included in the first group, and may be also included in the second group, there are no limited thereto.

In step S320, it is determined whether an amount of times that an event notification rule is satisfied is equal to K. That is to say, it is checked whether the event notification rule is satisfied for the K-th time. In the case where it is determined that the amount of times that the event notification rule is satisfied is equal to K (i.e., it is determined that the event notification rule is satisfied for the K-th time), an event notification is sent to at least one notified party in the plurality of notified parties. For example, the event notification is sent to at least one group, i.e., to all the notified parties in the selected group. Sending the event notification in the case where it is determined that the amount of times that the event notification rule is satisfied is equal to K is denoted as initial notification. That is, in this case, sending the event notification this time is denoted as initial notification. K is a positive integer.

In step S330, after the initial notification is performed, it is determined whether the amount of times that the event notification rule is satisfied is equal to P. That is to say, it is checked whether the event notification rule is satisfied for the P-th time. In the case where it is determined that the amount of times that the event notification rule is satisfied is equal to P (i.e., it is determined that the event notification rule is satisfied for the P-th time), an event notification is sent to at least one notified party in the plurality of notified parties. For example, the event notification is sent to at least one group, i.e., to all the notified parties in the selected group. Sending the event notification in the case where it is determined that the amount of times that the event notification rule is satisfied is equal to P is denoted as re-notification. That is, in this case, sending the event notification this time is denoted as re-notification. P is a positive integer. The initial notification and the re-notification are performed at different times, that is, there is sequential order to perform the initial notification and the re-notification. The at least one notified party notified in the initial notification is at least partially different from the at least one notified party notified in the re-notification.

In the embodiments of the present disclosure, the initial notification and the re-notification are performed at different times. The initial notification and the re-notification are not performed at the same time, and there is sequential order to perform the initial notification and the re-notification. Therefore, different notified parties can receive event notification at different times or in different conditions. For example, notified parties in different groups can receive event notification at different times or in different conditions. Therefore, hierarchical notification can be received, and the flexibility of notification can be improved, so as to meet the diversified requirements of users.

For example, in some examples, determining whether the amount of times that the event notification rule is satisfied is equal to P comprises: determining, at a time point determined by a check event notification interval, whether the event notification rule is satisfied, and when the event notification rule is satisfied, determining whether the amount of times that the event notification rule is satisfied is equal to P.

For example, in some other examples, determining whether the amount of times that the event notification rule is satisfied is equal to P comprises: determining, at a time point determined by a send notification interval, whether the event notification rule is satisfied, and when the event notification rule is satisfied, determining whether the amount of times that the event notification rule is satisfied is equal to P.

In some examples, as illustrated in FIG. 14, the method further includes step S340.

Step S340: after the re-notification is performed, determining whether the amount of times that the event notification rule is satisfied is equal to Q, and in the case where it is determined that the amount of times that the event notification rule is satisfied is equal to Q, sending an event notification to at least one notified party in the plurality of notified parties, where sending the event notification in the case where it is determined that the amount of times that the event notification rule is satisfied is equal to Q is denoted as a third notification, and Q is a positive integer, where the third notification, the initial notification and the re-notification are performed at different times, and the at least one notified party notified in the third notification is at least partially different from the at least one notified party notified in the initial notification, and is at least partially different from the at least one notified party notified in the re-notification.

For example, in step S340, the third notification is performed in the present condition that the amount of times that the event notification rule is satisfied is equal to Q. That is, the notification can be performed more than twice. It should be noted that the notification can be performed twice, for three times, for four times, etc., which is not limited in the embodiments of the present disclosure.

For example, in some examples, P≥K+1.

In some examples, P=K+1. In this case, for example, when the event notification rule is satisfied for the first time, the initial notification is performed; when the event notification rule is satisfied for the second time, the re-notification is performed. It should be noted that, the embodiments of the present disclosure are not limited to including only two times of notification, there may be more than two times of notification. For example, in some other examples, when the event notification rule is satisfied for the first time, a notification is performed; when the event notification rule is satisfied for the second time, a notification is performed; when the event notification rule is satisfied for the third time, a notification is performed; when the event notification rule is satisfied for the fourth time, a notification is performed; and so on. In this case, when the notification performed in the first time is regarded as the initial notification, the notification performed in the second time is equivalent to the re-notification; when the notification performed in the second time is regarded as the initial notification, the notification performed in the third time is equivalent to the re-notification; when the notification performed in the third time is regarded as the initial notification, the notification performed in the fourth time is equivalent to the re-notification; and so on.

In some examples, P>K+1. In this case, for example, when the event notification rule is satisfied for the first time, the initial notification is performed; when the event notification rule is satisfied for the fourth time, the re-notification is performed. It should be noted that, the embodiments of the present disclosure are not limited to including only two times of notification, there may be more than two times of notification. For example, in some other examples, when the event notification rule is satisfied for the first time, a notification is performed; when the event notification rule is satisfied for the fourth time, a notification is performed; when the event notification rule is satisfied for the seventh time, a notification is performed; when the event notification rule is satisfied for the ninth time, a notification is performed; and so on. In this case, when the notification performed in the first time is regarded as the initial notification, the notification performed in the fourth time is equivalent to the re-notification; when the notification performed in the fourth time is regarded as the initial notification, the notification performed in the seventh time is equivalent to the re-notification; when the notification performed in the seventh time is regarded as the initial notification, the notification performed in the ninth time is equivalent to the re-notification; and so on.

For example, in some cases, when the event notification rule is satisfied for the first time, the initial notification is performed; when the event notification rule is satisfied for the second time, the re-notification is performed; when the event notification rule is satisfied for the third time, the third notification is performed. For example, in another case, when the event notification rule is satisfied for the fourth time, the initial notification is performed; when the event notification rule is satisfied for the sixth time, the re-notification is performed; when the event notification rule is satisfied for the ninth time, the third notification is performed. The specific value of the amount of times that the event notification rule is satisfied is not limited in the embodiments of the present disclosure.

For example, when determining whether the amount of times that the event notification rule is satisfied is equal to K, the amount of times that the event notification rule is satisfied is counted by a first count parameter. The first count parameter is, for example, a counter. When determining whether the amount of times that the event notification rule is satisfied is equal to P, the amount of times that the event notification rule is satisfied is counted by a second count parameter. The second count parameter is, for example, a counter. For example, the first count parameter and the second count parameter are a same count parameter. That is to say, when determining whether the amount of times that the event notification rule is satisfied is equal to K and when determining whether the amount of times that the event notification rule is satisfied is equal to P, the amount of times that the event notification rule is satisfied is counted by using a same one counter, so that the amount of times that the event notification rule is satisfied is counted in an accumulative way. In an exemplary case, assuming that K=5 and P=7, a counter is increased by 1 each time the event notification rule is satisfied. When the counter reaches to 5, it is determined that the amount of times that the event notification rule is satisfied is equal to K. When the counter reaches to 7, it is determined that the amount of times that the event notification rule is satisfied is equal to P. The total times that the event notification rule is satisfied is 7. The example described above is only exemplary, the embodiments of the present disclosure do not limit the specific values of K and P. For example, P≥K+1.

For example, when determining whether the amount of times that the event notification rule is satisfied is equal to K, the amount of times that the event notification rule is satisfied is counted by a first count parameter; when determining whether the amount of times that the event notification rule is satisfied is equal to P, the amount of times that the event notification rule is satisfied is counted by a second count parameter. The first count parameter and the second count parameter are different count parameters, and the second count parameter starts counting after the initial notification is performed. That is to say, when determining whether the amount of times that the event notification rule is satisfied is equal to K and when determining whether the amount of times that the event notification rule is satisfied is equal to P, the amount of times that the event notification rule is satisfied is counted by using different counters, so that the amount of times that the event notification rule is satisfied is counted in a separate way. In this case, P may be smaller than K+1, and may also be smaller than K. In an exemplary case, assuming that K=2 and P=4, a first counter is increased by 1 each time the event notification rule is satisfied when determining whether the amount of times that the event notification rule is satisfied is equal to K. When the first counter reaches to 2, it is determined that the amount of times that the event notification rule is satisfied is equal to K. Then, a second counter is increased by 1 each time the event notification rule is satisfied after the initial notification is performed, i.e., the second counter starts counting after the initial notification is performed. When the second counter reaches to 4, it is determined that the amount of times that the event notification rule is satisfied is equal to P. The total times that the event notification rule is satisfied is 6 (the first counter reaches to 2 and the second counter reaches to 4, 2+4=6). The example described above is only exemplary, the embodiments of the present disclosure do not limit the specific values of K and P.

For example, the at least one notified party sent with the event notification in the initial notification is denoted as an initial-notification group. The at least one notified party sent with the event notification in the re-notification is denoted as a re-notification group. The initial-notification group is different from the re-notification group. That is, in the initial notification and re-notification, event notifications are sent to different groups.

For example, the at least one notified party comprised in the initial-notification group and the at least one notified party comprised in the re-notification group are at least partially different from each other. That is, the notified parties included in the initial-notification group and the notified parties included in the re-notification group are not completely same.

For example, the event subscription request is used for subscribing for an event related to a resource, and the event subscription request is a single-resource subscription request. For example, in a case, the event subscription request is used for requesting receipt of update data from an application entity. In some embodiments, the event notification method further includes step S350. In step S350, it is determined whether the event notification rule is satisfied based on the update data of the application entity. For example, once the update data from the application entity is received, it is determined that the event notification rule is satisfied. It should be noted that the event subscription request is not limited to requesting receipt of update data, but also can be used for other event subscription, which is not limited by the embodiments of the present disclosure.

For example, the event subscription request is used for subscribing for events related to multiple resources, and the event subscription request is a cross-resource subscription request. For example, in a case, the event subscription request is used for requesting receipt of update data from a plurality of application entities. In some embodiments, the event notification method further includes step S360. In step S360, it is determined whether the event notification rule is satisfied based on the update data of the plurality of application entities within a preset time window. It should be noted that the event subscription request is not limited to requesting receipt of update data, but also can be used for other event subscription, which is not limited by the embodiments of the present disclosure.

Figure 15:
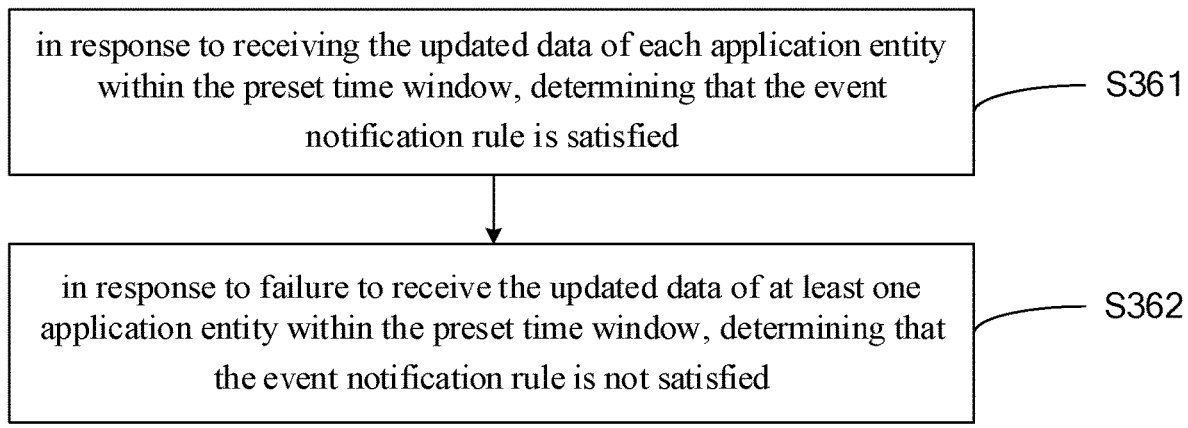
FIG. 15 illustrates a flow chart of determining whether the event notification rule is satisfied based on the update data of the plurality of application entities within a preset time window according to some embodiments of the present disclosure.

FIG. 15 illustrates a flow chart of determining whether the event notification rule is satisfied based on the update data of the plurality of application entities within a preset time window according to some embodiments of the present disclosure. Referring to FIG. 15, the process of determining whether the event notification rule is satisfied based on the update data of the plurality of application entities within the preset time window includes the following steps S361-S362.

S361: in response to receiving the updated data of each application entity within the preset time window, determining that the event notification rule is satisfied; and S362: in response to failure to receive the updated data of at least one application entity within the preset time window, determining that the event notification rule is not satisfied.

For example, in step S361, if the updated data of each application entity is received within the preset time window, it is determined that the event notification rule is satisfied. That is, when the updated data of all the application entities is received within the preset time window, it is determined that the event notification rule is satisfied.

For example, in step S362, if the updated data of at least one application entity is not received within the preset time window, it is determined that the event notification rule is not satisfied.

For example, the event notification method further includes defining at least a part of following attributes: an event notification rule attribute or an event notification list attribute. The event notification rule attribute is used for determining whether to send the event notification to the notified party. The event notification list attribute is used for storing address information of the plurality of notified parties based on the plurality of groups.

For example, the event notification method further includes: determining the at least one notified party to which the event notification is to be sent based on an order of the plurality of notified parties. For example, the event subscription request is at least one of a single-resource subscription request or a cross-resource subscription request.

Figure 16:
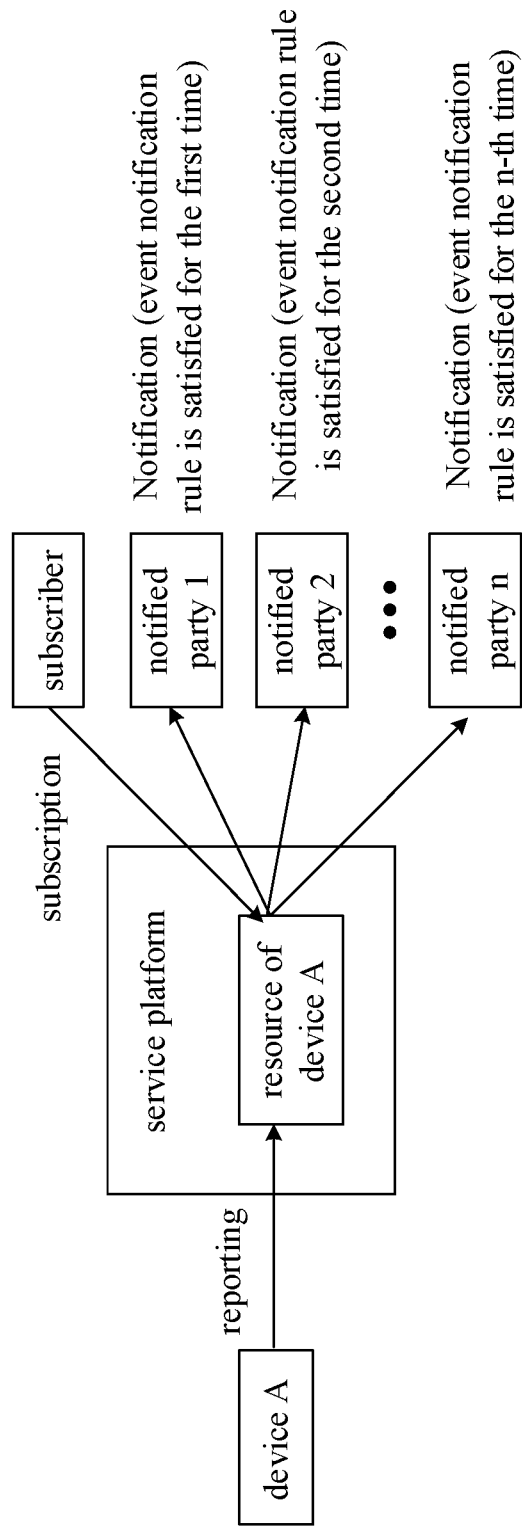
FIG. 16 illustrates a schematic diagram of an example of an event notification method according to some embodiments of the present disclosure.

FIG. 16 illustrates a schematic diagram of an example of an event notification method according to some embodiments of the present disclosure. Referring to FIG. 16, this example realizes hierarchical notification for single resource. An even notification is sent to one notified party every time the event notification rule is satisfied. For example, the notified parties are represented as follows: notified party 1, notified party 2, . . . , notified party n. Different notified parties are separated by commas. The subscriber sends an event subscription request to the service platform to subscribe the event of the device A. When the device A reports the update data to the service platform for the first time, the service platform determines that the event notification rule is satisfied for the first time, and thus the service platform sends an event notification to the notified party 1; when the device A reports the update data to the service platform for the second time, the service platform determines that the event notification rule is satisfied for the second time, and thus the service platform sends an event notification to the notified party 2; and so on. When the device A reports the update data to the service platform for the n-th time, the service platform determines that the event notification rule is satisfied for the n-th time, and thus the service platform sends an event notification to the notified party n. In this case, P=K+1, the amount of times that the event notification rule is satisfied is counted in an accumulative way, and each group includes one notified party.

Figure 17:
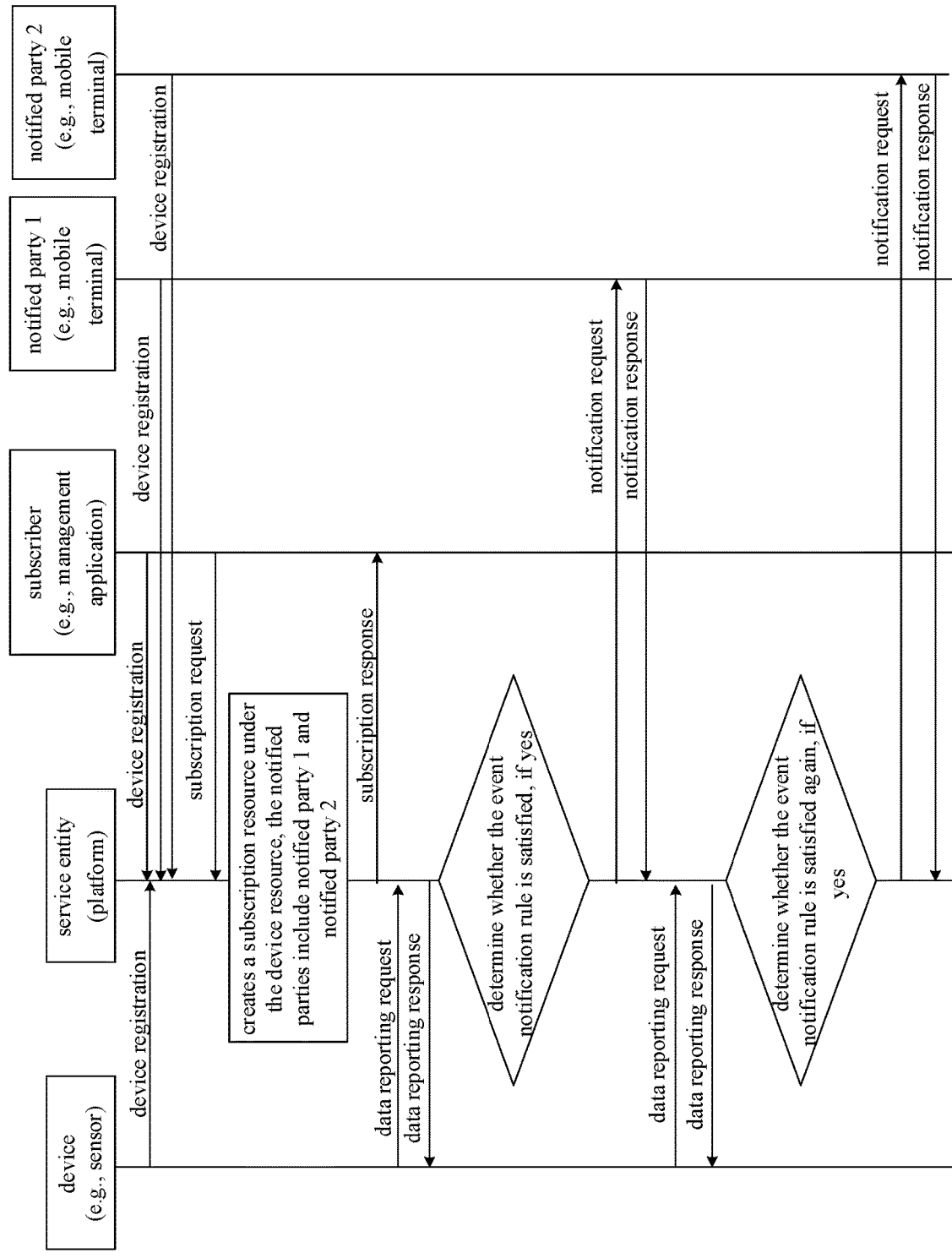
FIG. 17 illustrates a flow chart of an event notification method corresponding to the example shown in FIG. 16.

FIG. 17 illustrates a flow chart of an event notification method corresponding to the example shown in FIG. 16. Referring to FIG. 17, the Internet of Things may be composed of a universal service entity (also referred to as a service entity) and a series of application entities, which may be various devices (i.e., sensors) or user terminals such as mobile terminals, and may also be a software module or the like in the devices, such as a mobile terminal application. The universal service entity manages its connected application entities and performs operations such as registration, data transfer, execution of tasks, and the like. For example, as shown in FIG. 17, the service entity receives device registration requests from an application entity, i.e., a subscriber, thereby establishing an association relationship with the application entity and the subscriber. In the application subscribing to the request, the subscriber may send an event subscription request to the service entity, the event subscription request includes a plurality of notified parties. For example, the subscription request may be used to request for receipt of update data from the application entity, and the subscription request may also be used to request the service entity to perform a certain operation process, details are not described herein.

After receiving the subscription request from the subscriber, the service entity will create a subscription resource corresponding to the subscription request. For example, the subscription request may be used to request an event notification of manhole cover movement, and the subscription request from the subscriber may include a plurality of notified parties, for example, the subscription request from the subscriber includes a notified party 1 and a notified party 2.

For example, the universal service entity divides the notified parties included in the subscription request into a plurality of groups, for example, divides the notified parties into 2 groups, and stores information of the notified parties in the notified party list based on the grouping. For example, the first group may include the notified party 1, the second group may include the notified party 2. Each group includes one notified party. For example, different groups may be differentiated by a semicolon in the notified party list.

Referring to FIG. 17, the specific process is described as follows. First, the device, subscriber, notified party 1, and notified party 2 respectively send registration requests to the service entity and receive registration responses sent by the service entity. Then, the subscriber sends a subscription request to the service entity. The service entity creates a subscription resource under the device resource. The subscription resource includes event notification rule. The notified parties include the notified party 1 and the notified party 2. The notified party 1 is in front of the notified party 2. The service entity sends the subscription response to the subscriber. The device sends the data reporting request to the service entity and receives the data reporting response sent by the service entity. The service entity determines whether the event notification rule is satisfied. If yes, the service entity sends a notification to the notified party 1. This notification is called initial notification.

After the initial notification, i.e., after the service entity sends a notification to the notified party 1, the service entity receives the data reporting request sent by the device again, and returns the data reporting response. The service entity determines whether the event notification rule is satisfied again. If yes, the service entity sends a notification to the notified party 2. In this case, P=K+1, the amount of times that the event notification rule is satisfied is counted in an accumulative way, and each group includes one notified party.

Figure 18:
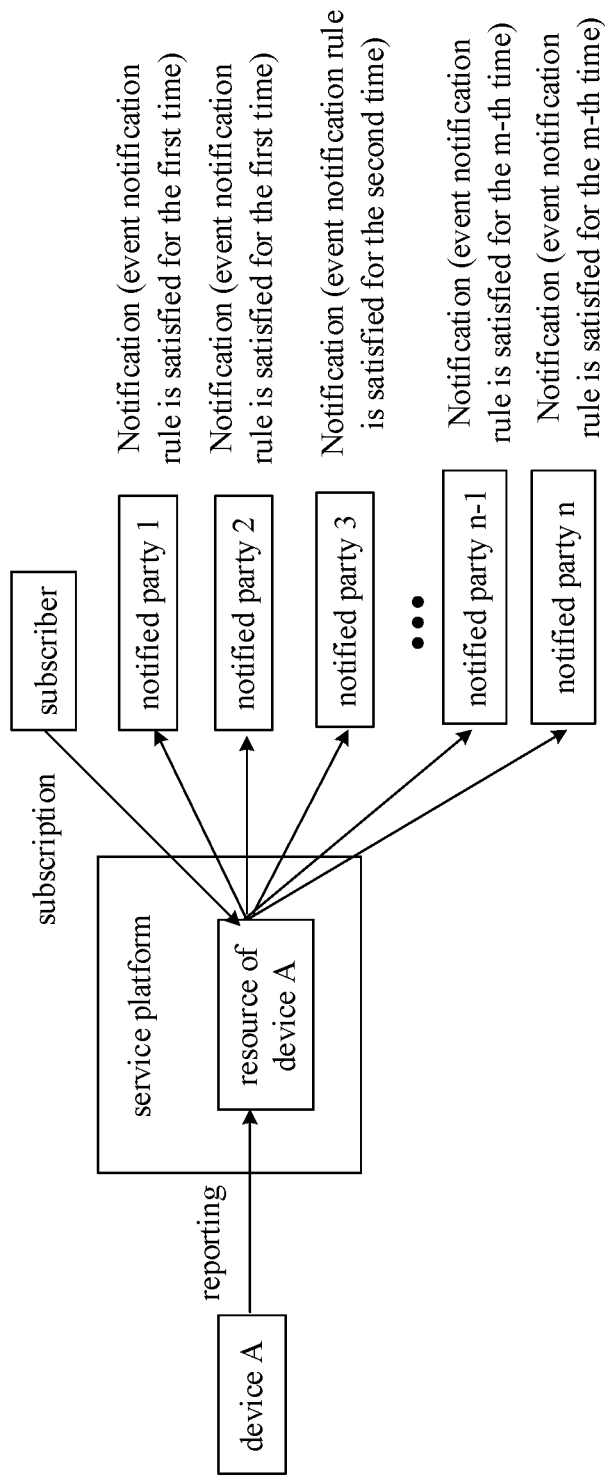
FIG. 18 illustrates a schematic diagram of an example of an event notification method according to some embodiments of the present disclosure.

FIG. 18 illustrates a schematic diagram of an example of an event notification method according to some embodiments of the present disclosure. Referring to FIG. 18, this example realizes hierarchical notification for single resource. An even notification is sent to one group of notified parties every time the event notification rule is satisfied. For example, the notified parties are represented as follows: notified party 1, notified party 2, notified party 3, . . . , notified party n-1, notified party n. The notified parties in the same group is divided by the comma, and the notified parties in different groups are divided by the semicolon. The subscriber sends an event subscription request to the service platform to subscribe the event of the device A. When the device A reports the update data to the service platform for the first time, the service platform determines that the event notification rule is satisfied for the first time, and thus the service platform sends an event notification to the first group of notified parties, for example, notified party 1 and notified party 2; when the device A reports the update data to the service platform for the second time, the service platform determines that the event notification rule is satisfied for the second time, and thus the service platform sends an event notification to the second group of notified parties, for example, the notified party 3; and so on. When the device A reports the update data to the service platform for the m-th time, the service platform determines that the event notification rule is satisfied for the m-th time, and thus the service platform sends an event notification to the m-th group of notified parties, for example, notified party n-1 and notified party n. In this case, P=K+1, the amount of times that the event notification rule is satisfied is counted in an accumulative way, and each group includes one or more notified parties.

Figure 19:
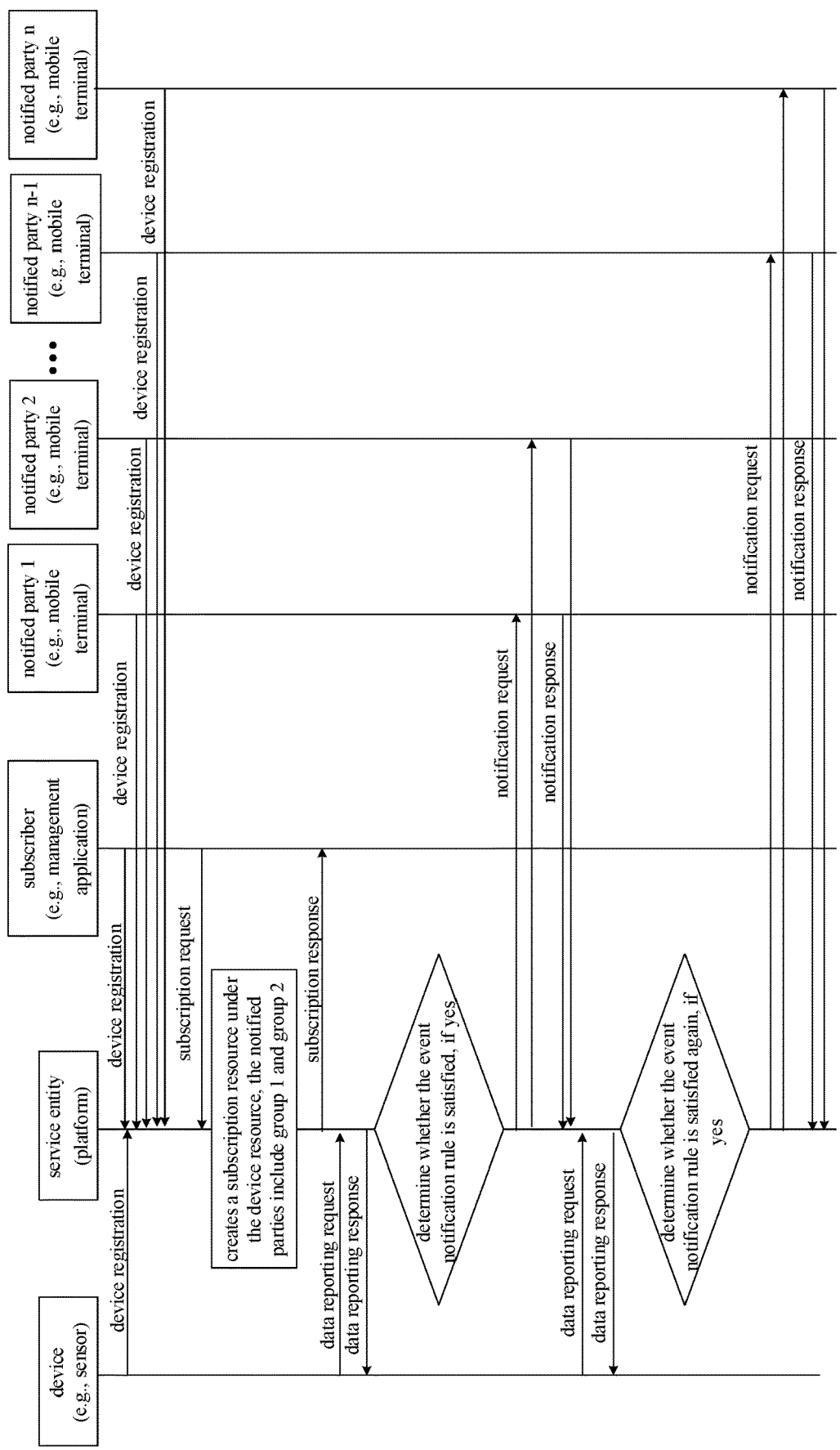
FIG. 19 illustrates a flow chart of an event notification method corresponding to the example shown in FIG. 18.

FIG. 19 illustrates a flow chart of an event notification method corresponding to the example shown in FIG. 18. Referring to FIG. 18, m=2, and the specific process is described as follows. First, the device, subscriber, notified party 1, notified party 2, . . . , notified party n-1, and notified party n respectively send a registration request to the service entity and receive the registration response sent by the service entity. Then the subscriber sends a subscription request to the service entity. The service entity creates a subscription resource under the device resource. The subscription resource includes event notification rule and the notified parties. The notified parties are divided into two groups. Group 1 includes the notified party 1 and the notified party 2. Group 2 includes other notified parties. The notified parties in the same group are divided by the comma, and the notified parties in different groups are divided by the semicolon. Then the service entity sends the subscription response to the subscriber. The device sends the data reporting request to the service entity and receives the data reporting response sent by the service entity. The service entity determines whether the event notification rule is satisfied. If yes, the service entity sends a notification to the notified parties in group 1, i.e., notified party 1 and notified party 2. This notification is called initial notification.

After the initial notification, the service entity receives the data reporting request sent by the device again, and returns the data reporting response. The service entity determines whether the event notification rule is satisfied again. If yes, the service entity sends a notification to the notified parties in group 2, i.e., notified party 3—notified party n. This notification is called re-notification. In this case, P=K+1, and the amount of times that the event notification rule is satisfied is counted in an accumulative way, and each group includes more than one notified party.

Figure 20:
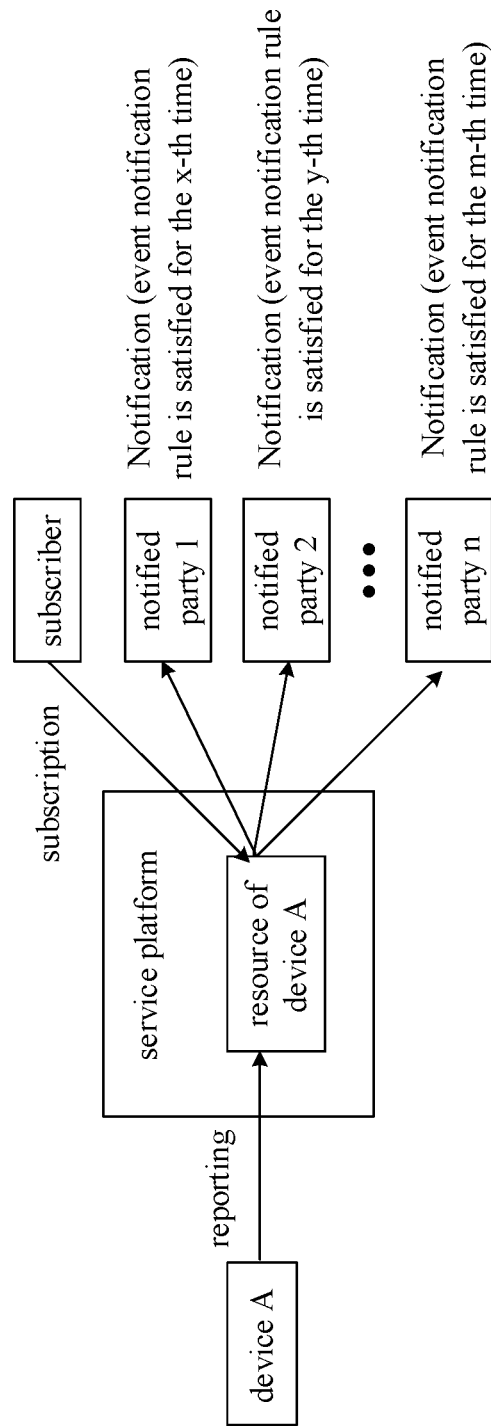
FIG. 20 illustrates a schematic diagram of an example of an event notification method according to some embodiments of the present disclosure.

FIG. 20 illustrates a schematic diagram of an example of an event notification method according to some embodiments of the present disclosure. Referring to FIG. 20, this example realizes hierarchical notification for single resource. An even notification is sent to one group of notified parties when the amount of times that the event notification rule is satisfied reaches to preset values, such as satisfying the multiple times notification rule. For example, the notified parties are represented as follows: (notified party 1, x), (notified party 2, y), . . . , (notified party n, m), and different notified parties are separated by commas. The subscriber sends an event subscription request to the service platform to subscribe the event of the device A. When the device A reports the update data to the service platform for the x-th time, the service platform determines that the event notification rule is satisfied for the x-th time, and thus the service platform sends an event notification to the notified party 1; when the device A reports the update data to the service platform for the y-th time, the service platform determines that the event notification rule is satisfied for the y-th time, and thus the service platform sends an event notification to the notified party 2; and so on. When the device A reports the update data to the service platform for the m-th time, the service platform determines that the event notification rule is satisfied for the m-th time, and thus the service platform sends an event notification to the notified party n. In this case, the amount of times that the event notification rule is satisfied is counted in an accumulative way or in a separate way, and each group includes one notified party.

Figure 21:
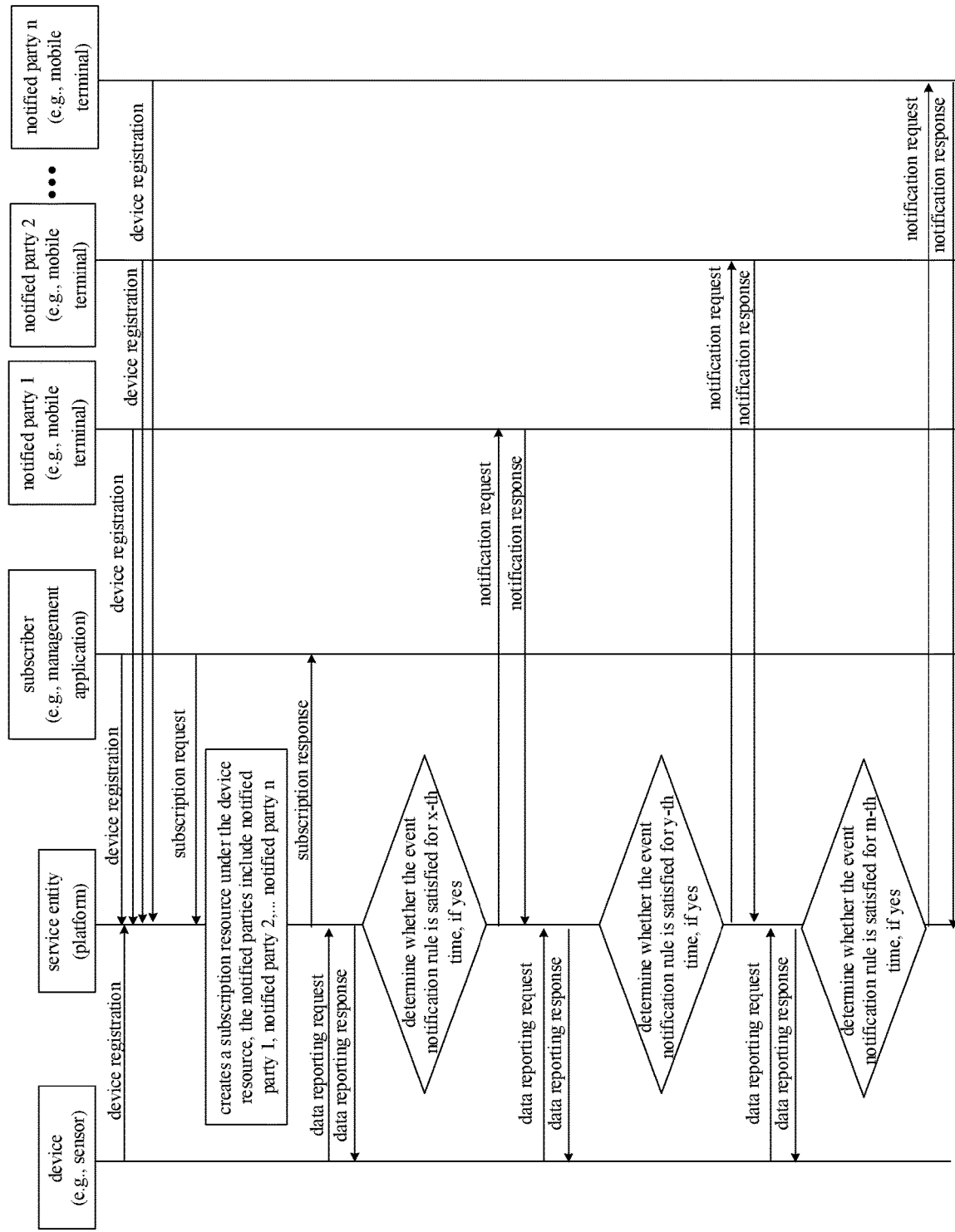
FIG. 21 illustrates a flow chart of an event notification method corresponding to the example shown in FIG. 20.

FIG. 21 illustrates a flow chart of an event notification method corresponding to the example shown in FIG. 20. Referring to FIG. 21, the specific process is described as follows. First, the device, the subscriber, the notified party 1, the notified party 2, . . . , and the notified party n respectively send the registration request to the service entity and receive the registration response sent by the service entity. Then the subscriber sends a subscription request to the service entity. The service entity creates a subscription resource under the device resource, which includes event notification rule and the notified parties. The notified parties are represented as follows: (notified party 1, x), (notified party 2, y), . . . , (notified party n, m). Different notified parties are separated by commas. Optional, x, y, and m can be cumulative or not cumulative. When m>y>x, it is determined to be cumulative. When x, y, and m do not meet the above relationship, they are not cumulative. Optionally, the cumulative relationship of x, y, and m can be identified by +, for example, (notified party 1, x), (notified party 2, y+), . . . , (notified party n, m+), which represents the cumulative relationship of x, y, and m. For another example, (notified party 1, x), (notified party 2, y+), . . . , (notified party n, m) means that x and y are cumulative, and m is differential (that is, m is counted separately).

It should be noted that the case where x, y, or m are cumulative corresponds to the case where the first count parameter and the second count parameter are a same count parameter described above; the case where x, y, or m are counted separately corresponds to the case where the first count parameter and the second count parameter are different count parameters and the second count parameter starts counting after the initial notification is performed described above.

Then the service entity sends the subscription response to the subscriber. The device sends the data reporting request to the service entity and receives the data reporting response sent by the service entity. The service entity determines whether the event notification rule is satisfied for the x-th time. If yes, the service entity sends a notification to the notified party 1. The service entity receives the data reporting request sent by the device again, and returns the data reporting response. The service entity determines whether the event notification rule is satisfied for the y-th time. If yes, the service entity sends a notification to the notified party 2. The service entity receives the data reporting request sent by the device again, and returns the data reporting response. The service entity determines whether the event notification rule is satisfied for the m-th time. If yes, the service entity sends a notification to the notified party n. In this case, the amount of times that the event notification rule is satisfied is counted in an accumulative way or in a separate way, and each group includes one notified party.

It should be note that, if the notification sent when the event notification rule is satisfied for the x-th time is regarded as the initial notification, the notification sent when the event notification rule is satisfied for the y-th time is regarded as the re-notification; if the notification sent when the event notification rule is satisfied for the y-th time is regarded as the initial notification, the notification sent when the event notification rule is satisfied for the m-th time is regarded as the re-notification.

Figure 22:
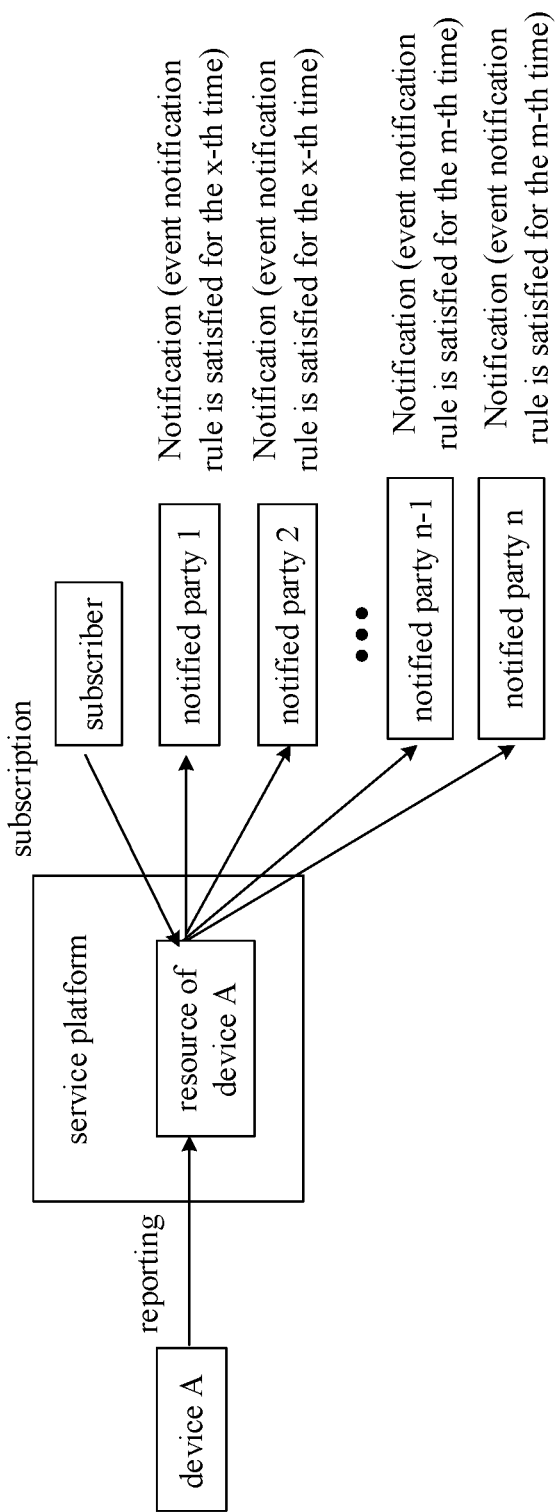
FIG. 22 illustrates a schematic diagram of an example of an event notification method according to some embodiments of the present disclosure.

FIG. 22 illustrates a schematic diagram of an example of an event notification method according to some embodiments of the present disclosure. Referring to FIG. 22, this example realizes hierarchical notification for single resource. An even notification is sent to one group of notified parties when the amount of times that the event notification rule is satisfied reaches to preset values, such as satisfying the multiple times notification rule. For example, the notified parties are represented as follows: (notified party 1, notified party 2, x), . . . , (notified party n–1, notified party n, m), and different notified parties are separated by commas. The subscriber sends an event subscription request to the service platform to subscribe the event of the device A. When the device A reports the update data to the service platform for the x-th time, the service platform determines that the event notification rule is satisfied for the x-th time, and thus the service platform sends an event notification to the first group of notified parties, such as notified party 1 and notified party 2; when the device A reports the update data to the service platform for the m-th time, the service platform determines that the event notification rule is satisfied for the m-th time, and thus the service platform sends an event notification to another group of notified parties, such as notified party n–1 and notified party n. In this case, the amount of times that the event notification rule is satisfied is counted in an accumulative way or in a separate way, and each group includes more than one notified party.

Figure 23:
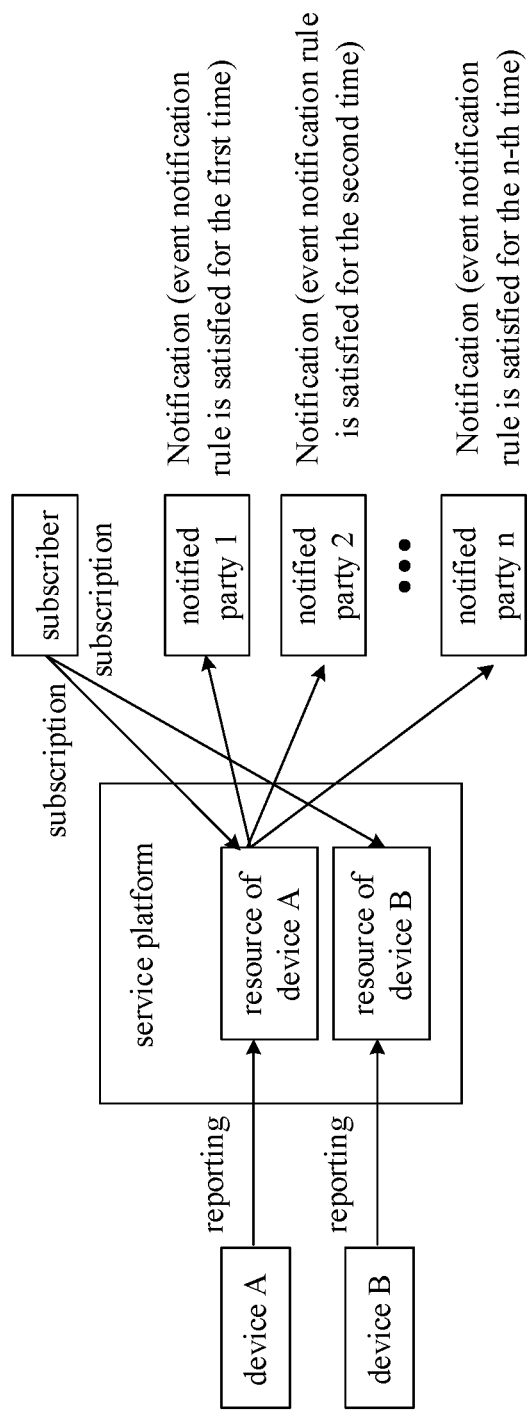
FIG. 23 illustrates a schematic diagram of an example of an event notification method according to some embodiments of the present disclosure.

FIG. 23 illustrates a schematic diagram of an example of an event notification method according to some embodiments of the present disclosure. Referring to FIG. 23, this example realizes hierarchical notification for cross resources. An even notification is sent to one notified party every time the event notification rule (i.e., the cross-resource event notification rule) is satisfied. For example, regarding resource subscription for device A and device B, cross-resource subscription resource can be created under the root resource of the service platform. The cross-resource subscription resource includes notified parties. For example, the notified parties are represented as follows: the notified party 1, the notified party 2, . . . , the notified party n. Different notified parties are separated by commas. The cross-resource subscription resource creates subscription resources to the resources of device A and device B, respectively. The cross-resource subscription resource may include a preset time window. The event received from device A and device B within the preset time window is valid event. For example, if the updated data of both device A and device B is received within the preset time window, it is determined that the event notification rule is satisfied; if the updated data of device A or device B is not received within the preset time window, it is determined that the event notification rule is not satisfied.

Figure 24:
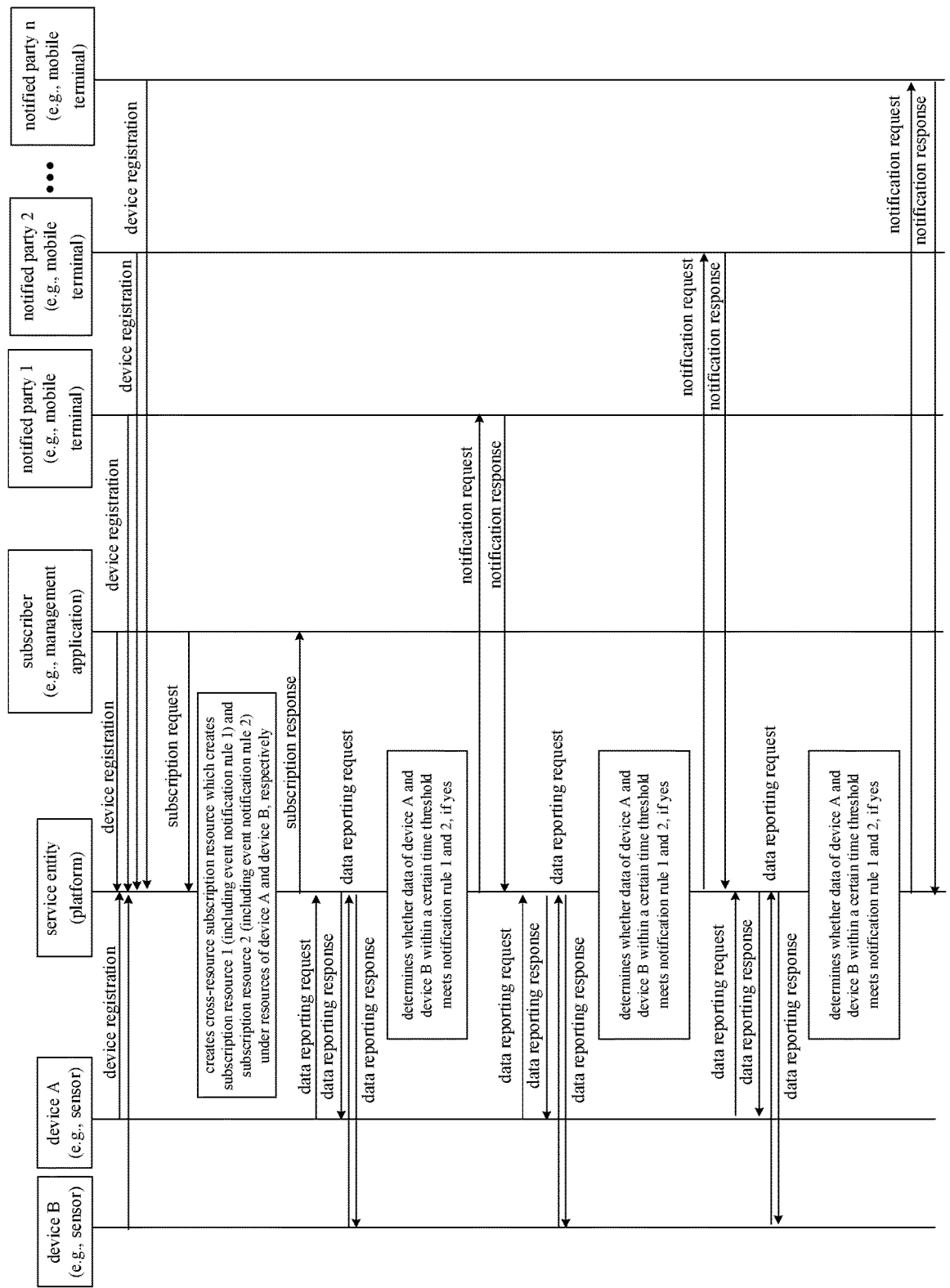
FIG. 24 illustrates a flow chart of an event notification method corresponding to the example shown in FIG. 23.

FIG. 24 illustrates a flow chart of an event notification method corresponding to the example shown in FIG. 23. Referring to FIG. 23, the specific process is described as follows. First, device A, device B, subscriber, notified party 1, notified party 2, . . . , and notified party n respectively send registration requests to the service entity and receive registration responses from the service entity. Then the subscriber sends a subscription request to the service entity. The cross-resource subscription resource is created under the root resource of the service platform. The cross-resource subscription resource includes the notified parties. For example, the notified parties are represented as follows: the notified party 1, the notified party 2, . . . , the notified party n. Different notified parties are separated by commas. The cross-resource subscription resource creates subscription resource to the resources of device A and the resources of device B, respectively. The cross-resource subscription resource may include a preset time window. The event received from device A and device B within the preset time window is valid event. For example, if the data of both device A and device B is received within the preset time window, it is determined that the event notification rule is satisfied.

Then, the service entity sends the subscription response to the subscriber. The device A and device B respectively send data reporting requests to the service entity and receive data reporting responses from the service entity. The service entity determines whether the data of device A and device B is received within a certain time window, i.e., determines whether the event notification rule is satisfied (whether both the event notification rule 1 and the event notification rule 2 are satisfied). If yes, the service entity sends a notification to the notified party 1.

The service entity receives the data reporting request sent by device A and device B again, and returns the data reporting response. The service entity determines whether the data of device A and device B is received within a certain time window, i.e., determines whether the event notification rule is satisfied (whether both the event notification rule 1 and the event notification rule 2 are satisfied). If yes, the service entity sends a notification to the notified party 2.

The service entity receives the data reporting request sent by device A and device B again, and returns the data reporting response. The service entity determines whether the data of device A and device B is received within a certain time window, i.e., determines whether the event notification rule is satisfied (whether both the event notification rule 1 and the event notification rule 2 are satisfied). If yes, the service entity sends a notification to the notified party n.

Figure 25:
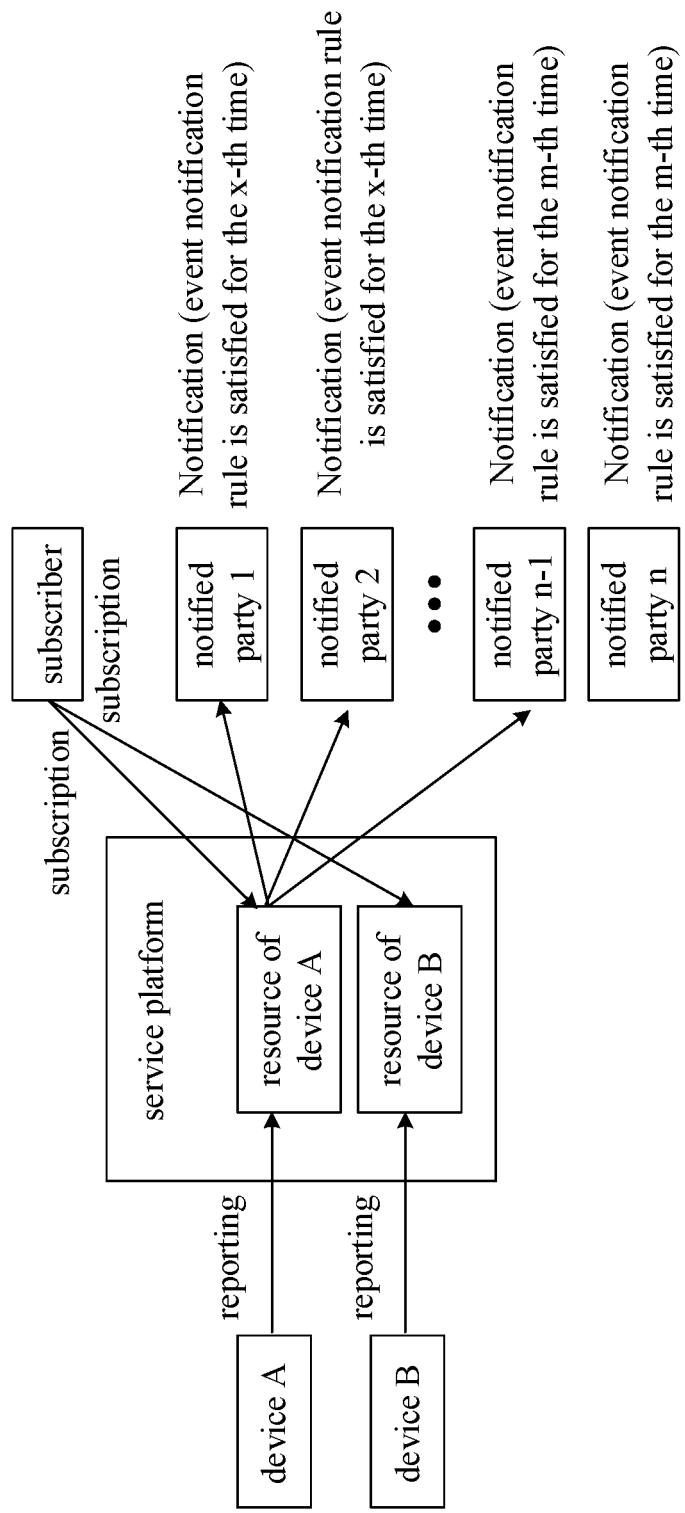
FIG. 25 illustrates a schematic diagram of an example of an event notification method according to some embodiments of the present disclosure.

FIG. 25 illustrates a schematic diagram of an example of an event notification method according to some embodiments of the present disclosure. Referring to FIG. 25, this example realizes hierarchical notification for cross resources. An even notification is sent to one group of notified parties when the amount of times that the event notification rule is satisfied reaches to preset values, such as satisfying the multiple times cross-resource event notification rule. For example, regarding resource subscription for device A and device B, cross-resource subscription resource can be created under the root resource of the service platform. The cross-resource subscription resource includes notified parties. For example, the notified parties are represented as follows: (the notified party 1, the notified party 2, x), . . . , (the notified party n−1, the notified party n, m). The cross-resource subscription resource creates subscription resources to the resources of device A and device B, respectively. The cross-resource subscription resource may include a preset time window. The event received from device A and device B within the preset time window is valid event. For example, if the updated data of both device A and device B is received within the preset time window, it is determined that the event notification rule is satisfied; if the updated data of device A or device B is not received within the preset time window, it is determined that the event notification rule is not satisfied.

Figure 12:
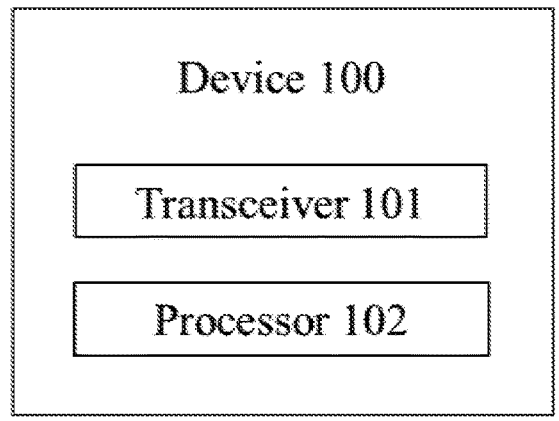
FIG. 12 illustrates a schematic diagram of a server device according to some embodiments of the present disclosure.

According to some embodiments of the present disclosure, a server device is further provided. FIG. 12 shows a schematic diagram of a server device according to some embodiments of the present disclosure. The server device 100 may comprise a transceiver 101 and a processor 102, wherein the transceiver 101 may be configured to receive an event subscription request from a subscriber, the event subscription request including one or more notified parties; the processor 102 may be configured to divide the one or more notified parties into one or more groups, each group of the one or more groups including one or more notified parties, and instruct the transceiver to send an event notification to notified parties in at least one group of the one or more groups.

According to some embodiments of the present disclosure, the processor 102 is further configured to: determine whether an event notification rule is satisfied, and in the case where the event notification rule is satisfied, instruct the transceiver 101 to send an event notification to notified parties in at least one group of the one or more groups.

According to some embodiments of the present disclosure, the processor 102 is further configured to: after instructing the transceiver 101 to send an event notification to notified parties in at least one group of the one or more groups, determine whether a re-notification criterion is satisfied, and in the case where the re-notification criterion is satisfied, instruct the transceiver 101 to send an event notification to notified parties in at least one group of the one or more groups; wherein the group to which an event notification is sent in the case where the event notification rule is satisfied is denoted as an initial-notification group, and the group to which an event notification is sent in the case where the re-notification criterion is satisfied is denoted as a re-notification group, the initial-notification group is different from the re-notification group.

According to some embodiments of the present disclosure, determining whether the re-notification criterion is satisfied comprises: determining, at a time point determined by a check event notification interval, whether an event notification rule is satisfied, and in the case where the event notification rule is satisfied, determining that the re-notification criterion is satisfied.

According to some embodiments of the present disclosure, determining whether the re-notification criterion is satisfied comprises: determining, at a time point determined by a send notification interval, whether an event notification rule is satisfied, and in the case where the event notification rule is satisfied, determining that the re-notification criterion is satisfied.

According to some embodiments of the present disclosure, determining whether the re-notification criterion is satisfied comprises: determining, at a time point determined by a send notification interval, that the re-notification criterion is satisfied.

Optionally, the server device 100 may also have a built-in or external memory for storing resources created for the application entity, and storing related instructions, which when executed by the processor 102, cause the steps of the event notification method described above to be performed.

In some embodiments, referring to FIG. 12, the server device 200 includes a transceiver 101 and a processor 102. The transceiver 101 is configured to receive an event subscription request from a subscriber. The event subscription request comprises a plurality of notified parties. The processor 102 is configured to: determine whether an amount of times that an event notification rule is satisfied is equal to K, and in the case where it is determined that the amount of times that the event notification rule is satisfied is equal to K, send an event notification to at least one notified party in the plurality of notified parties, where sending the event notification in the case where it is determined that the amount of times that the event notification rule is satisfied is equal to K is denoted as initial notification, and K is a positive integer; and after the initial notification is performed, determine whether the amount of times that the event notification rule is satisfied is equal to P, and in the case where it is determined that the amount of times that the event notification rule is satisfied is equal to P, send an event notification to at least one notified party in the plurality of notified parties, where sending the event notification in the case where it is determined that the amount of times that the event notification rule is satisfied is equal to P is denoted as re-notification, and P is a positive integer. The initial notification and the re-notification are performed at different times. The at least one notified party notified in the initial notification is at least partially different from the at least one notified party notified in the re-notification.

For example, the processor 102 is configured to: after the re-notification is performed, determine whether the amount of times that the event notification rule is satisfied is equal to Q, and in the case where it is determined that the amount of times that the event notification rule is satisfied is equal to Q, send an event notification to at least one notified party in the plurality of notified parties. Sending the event notification in the case where it is determined that the amount of times that the event notification rule is satisfied is equal to Q is denoted as a third notification, and Q is a positive integer. The third notification, the initial notification and the re-notification are performed at different times. The at least one notified party notified in the third notification is at least partially different from the at least one notified party notified in the initial notification, and is at least partially different from the at least one notified party notified in the re-notification.

For example, in some examples, P≥K+1.

For example, in some examples, when determining whether the amount of times that the event notification rule is satisfied is equal to K, the amount of times that the event notification rule is satisfied is counted by a first count parameter; when determining whether the amount of times that the event notification rule is satisfied is equal to P, the amount of times that the event notification rule is satisfied is counted by a second count parameter; and the first count parameter and the second count parameter are a same count parameter.

For example, in some other examples, when determining whether the amount of times that the event notification rule is satisfied is equal to K, the amount of times that the event notification rule is satisfied is counted by a first count parameter; when determining whether the amount of times that the event notification rule is satisfied is equal to P, the amount of times that the event notification rule is satisfied is counted by a second count parameter; and the first count parameter and the second count parameter are different count parameters, and the second count parameter starts counting after the initial notification is performed.

For example, the event subscription request is used for subscribing for events related to multiple resources, and the event subscription request is a cross-resource subscription request. For example, in a case, the event subscription request is used for requesting receipt of update data from a plurality of application entities, and the processor is further configured to determine whether the event notification rule is satisfied based on the update data of the plurality of application entities within a preset time window.

For example, the processor is further configured to: in response to receiving the updated data of each application entity within the preset time window, determine that the event notification rule is satisfied; and in response to failure to receive the updated data of at least one application entity within the preset time window, determine that the event notification rule is not satisfied.

Figure 13:
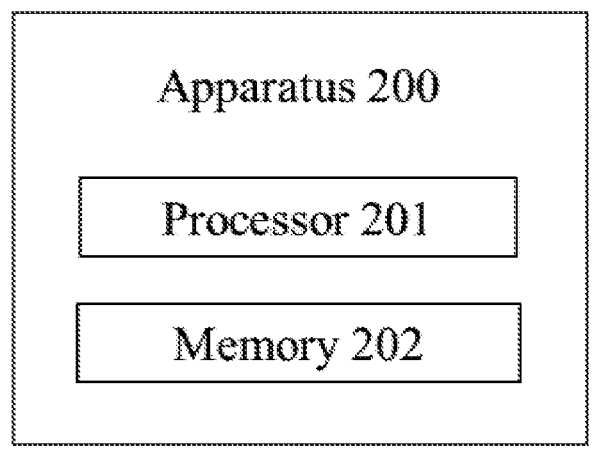
FIG. 13 illustrates a schematic diagram of an event notification apparatus according to some embodiments of the present disclosure.

An event notification apparatus is further provided according to some embodiments of the present disclosure. FIG. 13 shows a schematic diagram of an event notification apparatus according to some embodiments of the present disclosure. The event notification apparatus 200 may comprise one or more processors 201 and one or more memories 202. The computer-readable codes are stored in the memories 202, and the computer-readable codes can cause the event notification method as described above to be performed when executed by the one or more processors 202, and details are not described herein.

A computer storage medium is further provided according to some embodiments of the present disclosure. The computer-readable codes are stored in the computer storage medium, and the computer-readable codes can cause the event notification method as described above to be performed when executed by one or more processors, and details are not described herein.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

What is claimed is:

1. An event notification method, comprising:
receiving an event subscription request from a subscriber, the event subscription request comprising a plurality of notified parties;
determining whether an event notification rule is satisfied for K-th time, and in a case where it is determined that the event notification rule is satisfied for K-th time, sending an event notification to at least one notified party in the plurality of notified parties, wherein sending the event notification in the case where it is determined that the event notification rule is satisfied for K-th time is denoted as initial notification, and K is a positive integer; and
after the initial notification is performed, determining whether the event notification rule is satisfied for P-th time, and in a case where it is determined that the event notification rule is satisfied for P-th time, sending an event notification to at least one notified party in the plurality of notified parties, wherein sending the event notification in the case where it is determined that the event notification rule is satisfied for P-th time is denoted as re-notification, and P is a positive integer,
wherein the initial notification and the re-notification are performed at different moments,
in a case that there are a plurality of notified parties notified in the initial notification, at least one of the plurality of notified parties notified in the initial notification is different from the at least one notified party notified in the re-notification,
in a case that there are a plurality of notified parties notified in the re-notification, at least one of the plurality of notified parties notified in the re-notification is different from the at least one notified party notified in the initial notification, and
in a case that there is only one notified party notified in the initial notification and there is only one notified party notified in the re-notification, the notified party notified in the initial notification is different from the notified party notified in the re-notification.

2. The method according to claim 1, wherein, when determining whether the event notification rule is satisfied for K-th time, a number of times that the event notification rule is satisfied is counted by a first count parameter;
when determining whether the event notification rule is satisfied for P-th time, a number of times that the event notification rule is satisfied is counted by a second count parameter; and
the first count parameter and the second count parameter are a same count parameter.

3. The method according to claim 2, wherein $P \geq K+1$.

4. The method according to claim 1, wherein, when determining whether the event notification rule is satisfied for K-th time, a number of times that the event notification rule is satisfied is counted by a first count parameter;
when determining whether the event notification rule is satisfied for P-th time, a number of times that the event notification rule is satisfied is counted by a second count parameter; and
the first count parameter and the second count parameter are different count parameters, and the second count parameter starts counting after the initial notification is performed.

5. The method according to claim 1, further comprising:
after the re-notification is performed, determining whether the event notification rule is satisfied for Q-th time, and in a case where it is determined that the event notification rule is satisfied for Q-th time, sending an event notification to at least one notified party in the plurality of notified parties, wherein sending the event notification in the case where it is determined that the event notification rule is satisfied for Q-th time is denoted as a third notification, and Q is a positive integer,
wherein the third notification, the initial notification and the re-notification are performed at different moments,
in a case that there are a plurality of notified parties notified in the third notification, at least one of the plurality of notified parties notified in the third notification is different from the at least one notified party notified in the initial notification, and is different from the at least one notified party notified in the re-notification,
in a case that there are a plurality of notified parties notified in the initial notification, at least one of the plurality of notified parties notified in the initial notification is different from the at least one notified party notified in the third notification,
in a case that there is only one notified party notified in the third notification and there is only one notified party notified in the initial notification, the notified party notified in the third notification is different from the notified party notified in the initial notification,
in a case that there are a plurality of notified parties notified in the re-notification, at least one of the plurality of notified parties notified in the re-notification is different from the at least one notified party notified in the third notification,
in a case that there is only one notified party notified in the third notification and there is only one notified party notified in the re-notification, the notified party notified in the third notification is different from the notified party notified in the re-notification.

6. The method according to claim 1, wherein the plurality of notified parties are divided into a plurality of groups, and each group of the plurality of groups comprises at least one notified party,
the at least one notified party sent with the event notification in the initial notification is denoted as an initial-notification group,
the at least one notified party sent with the event notification in the re-notification is denoted as a re-notification group, and
the initial-notification group is different from the re-notification group.

7. The method according to claim 6, wherein, in a case that there are a plurality of notified parties in the initial-notification group, at least one of the plurality of notified parties in the initial-notification group is different from the at least one notified party comprised in the re-notification group,
in a case that there are a plurality of notified parties in the re-notification group, at least one of the plurality of notified parties in the re-notification group is different from the at least one notified party comprises in the initial-notification group, and in a case that there is only one notified party in the initial-notification group and there is only one notified party in the re-notification group, the notified party in the initial-notification group is different from the notified party in the re-notification group.

8. The method according to claim 1, wherein the event subscription request is used for subscribing for an event related to a resource, and the event subscription request is a single-resource subscription request.

9. The method according to claim 1, wherein the event subscription request is used for subscribing for events related to multiple resources, and the event subscription request is a cross-resource subscription request.

10. The method according to claim 9, further comprising:
determining whether the event notification rule is satisfied based on update data of the multiple resources within a preset time window.

11. The method according to claim 10, wherein determining whether the event notification rule is satisfied based on the update data of the multiple resources within the preset time window comprises:
in response to receiving the updated data of each resource within the preset time window, determining that the event notification rule is satisfied; and
in response to failure to receive the updated data of at least one resource within the preset time window, determining that the event notification rule is not satisfied.

12. The method according to claim 1, further comprising defining at least a part of following attributes:
an event notification rule attribute used for determining whether to send the event notification to the notified party; or
an event notification list attribute used for storing address information of the plurality of notified parties.

13. The method according to claim 1, further comprising:
determining the at least one notified party to which the event notification is to be sent based on an order of the plurality of notified parties.

14. The method according to claim 1, wherein determining whether the event notification rule is satisfied for P-th time comprises:
determining, at a time point determined by a check event notification interval, whether the event notification rule is satisfied, and when the event notification rule is satisfied, determining whether a number of times that the event notification rule is satisfied is equal to P.

15. The method according to claim 1, wherein determining whether the event notification rule is satisfied for P-th time comprises:
determining, at a time point determined by a send notification interval, whether the event notification rule is satisfied, and when the event notification rule is satisfied, determining whether a number of times that the event notification rule is satisfied is equal to P.

16. A server device, comprising a transceiver and a processor,
wherein the transceiver is configured to receive an event subscription request from a subscriber, and the event subscription request comprises a plurality of notified parties; and
the processor is configured to:
determine whether an event notification rule is satisfied for K-th time, and in a case where it is determined that the event notification rule is satisfied for K-th time, send an event notification to at least one notified party in the plurality of notified parties, wherein sending the event notification in the case where it is determined that the event notification rule is satisfied for K-th time is denoted as initial notification, and K is a positive integer; and
after the initial notification is performed, determine whether the event notification rule is satisfied for P-th time, and in a case where it is determined that the event notification rule is satisfied for P-th time, send an event notification to at least one notified party in the plurality of notified parties, wherein sending the event notification in the case where it is determined that the event notification rule is satisfied for P-th time is denoted as re-notification, and P is a positive integer,
wherein the initial notification and the re-notification are performed at different moments,
in a case that there are a plurality of notified parties notified in the initial notification, at least one of the plurality of notified parties notified in the initial notification is different from the at least one notified party notified in the re-notification,
in a case that there are a plurality of notified parties notified in the re-notification, at least one of the plurality of notified parties notified in the re-notification is different from the at least one notified party notified in the initial notification, and
in a case that there is only one notified party notified in the initial notification and there is only one notified party notified in the re-notification, the notified party notified in the initial notification is different from the notified party notified in the re-notification.

17. The server device according to claim 16, wherein, when determining whether the event notification rule is satisfied for K-th time, a number of times that the event notification rule is satisfied is counted by a first count parameter;
when determining whether the event notification rule is satisfied for P-th time, a number of times that the event notification rule is satisfied is counted by a second count parameter; and
the first count parameter and the second count parameter are a same count parameter.

18. The server device according to claim 16, wherein, when determining whether the event notification rule is satisfied for K-th time, a number of times that the event notification rule is satisfied is counted by a first count parameter;
when determining whether the event notification rule is satisfied for P-th time, a number of times that the event notification rule is satisfied is counted by a second count parameter; and
the first count parameter and the second count parameter are different count parameters, and the second count parameter starts counting after the initial notification is performed.

19. An event notification apparatus, comprising:
one or more processors; and
one or more memories in which computer-readable codes are stored, and the computer-readable codes causing, when executed by the one or more processors, the method according to claim 1 to be performed.

20. A non-transitory computer storage medium, in which computer-readable codes are stored, wherein the computer-readable codes cause, when executed by one or more processors, the method according to claim 1 to be performed.

* * * * *